United States Patent
Bowen et al.

[11] Patent Number: 6,047,747
[45] Date of Patent: Apr. 11, 2000

[54] SYSTEM FOR VEHICULAR, LAND-BASED DISTRIBUTION OF LIQUEFIED NATURAL GAS

[75] Inventors: Ronald R. Bowen, Magnolia; Moses Minta, Sugar Land, both of Tex.

[73] Assignee: ExxonMobil Upstream Research Company, Houston, Tex.

[21] Appl. No.: 09/099,265

[22] Filed: Jun. 18, 1998

Related U.S. Application Data

[60] Provisional application No. 60/050,280, Jun. 20, 1997, provisional application No. 60/053,966, Jul. 28, 1997, and provisional application No. 60/068,110, Dec. 19, 1997.

[51] Int. Cl.$^7$ ..................................................... B65B 1/04
[52] U.S. Cl. .................. 141/231; 141/4; 141/5; 141/95; 220/562; 220/581; 220/586; 62/45.1; 62/53.2; 420/91; 420/92; 420/112; 420/119
[58] Field of Search ........................ 141/1, 2, 4, 5, 141/11, 18, 21, 82, 95, 231, 232; 148/327, 335, 336; 220/4.16, 562, 581, 586; 62/45.1, 47.1, 48.1, 50.2, 53.2, 54.2; 222/608, 626; 420/91, 92, 112, 119

[56] References Cited

U.S. PATENT DOCUMENTS

| | | | |
|---|---|---|---|
| 2,004,074 | 6/1935 | Kiley | 220/85 |
| 2,795,937 | 6/1957 | Sattler et al. | 62/1 |
| 2,940,268 | 6/1960 | Morrison | 62/7 |
| 3,097,294 | 7/1963 | Kubli et al. | 219/145 |
| 3,232,725 | 2/1966 | Secord et al. | 48/190 |
| 3,298,805 | 1/1967 | Secord et al. | 48/190 |
| 3,477,509 | 11/1969 | Arendt | 166/252 |
| 3,745,322 | 7/1973 | Ito et al. | 219/137 |
| 3,853,611 | 12/1974 | Godai et al. | 117/205 |
| 3,864,918 | 2/1975 | Lorenz | 60/651 |
| 3,931,908 | 1/1976 | Cheyney | 220/71 |
| 4,024,720 | 5/1977 | Dimentberg et al. | 62/55 |
| 4,068,113 | 1/1978 | Godai et al. | 219/146.23 |
| 4,162,158 | 7/1979 | Hwang et al. | 75/124 |
| 4,182,254 | 1/1980 | Secord | 114/74 |
| 4,257,808 | 3/1981 | Morris Jr. et al. | 75/123 N |
| 4,315,407 | 2/1982 | Creed et al. | 62/53 |
| 4,374,478 | 2/1983 | Secord | 73/836.31 |
| 4,459,929 | 7/1984 | Ffooks | 114/74 |
| 4,687,525 | 8/1987 | Biniasz et al. | 148/336 |
| 4,776,900 | 10/1988 | Yano et al. | 148/12 R |
| 5,199,266 | 4/1993 | Johansen | 62/8 |
| 5,484,098 | 1/1996 | Anttila et al. | 228/184 |
| 5,531,842 | 7/1996 | Koo et al. | 148/654 |
| 5,545,269 | 8/1996 | Koo et al. | 148/654 |
| 5,545,270 | 8/1996 | Koo et al. | 148/654 |
| 5,755,895 | 5/1998 | Tamehiro et al. | 148/336 |
| 5,762,119 | 6/1998 | Platz et al. | 141/231 |
| 5,798,004 | 8/1998 | Tamehiro et al. | 148/336 |
| 5,878,814 | 3/1999 | Breivik et al. | 166/267 |

FOREIGN PATENT DOCUMENTS

| | | |
|---|---|---|
| 55-107763 | 8/1980 | Japan . |
| 7-331328 | 12/1995 | Japan . |
| 8-176659 | 7/1996 | Japan . |
| WO 96/23083 | 8/1996 | Japan . |
| WO 96/23909 | 8/1996 | Japan . |
| 8-295982 | 11/1996 | Japan . |
| 1522609 | 8/1978 | United Kingdom ............ F17C 11/02 |

OTHER PUBLICATIONS

Reference cited by the Taiwan Patent Office in related application, reference title—"Electronic Welding Operation Handbook Part 1", 1994, pp. 33–41; English language translations of relevant portions as provided by Applicant's agent in Taiwan.

(List continued on next page.)

*Primary Examiner*—Steven O. Douglas
*Assistant Examiner*—Timothy L. Maust
*Attorney, Agent, or Firm*—Marcy M. Lyles

[57] ABSTRACT

Systems are provided for vehicular, land-based distribution of pressurized liquefied natural gas at a pressure of about 1035 kPa (150 psia) to about 7590 kPa (1100 psia) and at a temperature of about −123° C. (−190° F.) to about −62° C. (−80° F.). The systems include at least one container that is constructed from an ultra-high strength, low alloy steel containing less than 9 wt % nickel and having a tensile strength greater than 830 MPa (120 ksi) and a DBTT lower than about −73° C. (−100° F.).

14 Claims, 4 Drawing Sheets

OTHER PUBLICATIONS

Reference cited by the Taiwan Patent Office in related application, reference title—"Welding Handbook vol. 2", 1993, pp. 190–195; English language translations of relevant portions as provided by Applicant's agent in Taiwan.

K. E. Dorschu et al, "Development of a Filler Metal for a High–Toughness Alloy Plate Steel with a Minimum Yield Strength of 140 ksi", The Welding Journal, Dec. 1964, pp. 564s–575s.

G. G. Saunders, "Effect of Major Alloying Elements on the Toughness of High Strength Weld Metal", Welding Research International, vol. 7, No. 2, 1977, pp. 91–118.

S. G. Ladkany, "Composite Aluminum–Fiberglass Epoxy Pressure Vessels for Transportation of LNG at Intermediate Temperature", published in Advances in Cryogenic Engineering, Materials, vol. 28, (Proceedings of the 4th International Cryogenic Materials Conference), San Diego, CA, USA, Aug. 10–14, 1981, pp. 905–913.

Roger Ffooks, "Natural Gas By Sea The Development of a New Technology", published 1983 (second edition) by Witherby & Co. Ltd., Chapter 14, especially pp. 162–164 and 175–176. (month of publication not provided; year of publication is sufficiently earlier than priority date that month of publication not in issue).

R. J. Broeker, "A New Process for the Transportation of Natural Gas", International LNG Conference, Chicago, Apr. 1968, Session No. 5, Paper No. 30.

C. P. Bennett, "Marine Transporation of LNG at intermediate temperature", CME, Mar. 1979, pp. 63–64.

E. K. Faridany et al., "The Ocean Phoenix Pressure–LNG System", Gastech 1976, pp. 267–280. (month of publication not provided; year of publication is sufficiently earlier than priority date that month of publication not in issue.

E. K. M. Faridany et al., "A Pressure LNG System", European Offshore Petroleum Conference & Exhibition, Oct. 21–24, 1980, vol. EUR 171, pp. 245–254.

Broeker, R. J. "CNG and MLG–New Natural Gas Transporation Process", pp. 138–140, American Gas Journal, Jul. 1969.

Prof. E. F. Fluggen and Dr. I. H. Backhaus, "Pressurised LNG—and the Utilisation of Small Gas Fields", Gastech 78 LNG/LPG Conference (Monte Carlo, Nov. 7–10, 1978) Proceedings, pp. 195–204.

SYSTEM FOR VEHICULAR, LAND-BASED DISTRIBUTION OF LIQUEFIED NATURAL GAS

This application claims the benefit of (i) U.S. Provisional Application No. 60/050,280, filed Jun. 20, 1997; (ii) U.S. Provisional Application No. 60/053,966, filed Jul. 28, 1997; and (iii) U.S. Provisional Application No. 60/068,110, filed Dec. 19, 1997.

FIELD OF THE INVENTION

The present invention relates to systems for vehicular, land-based distribution of pressurized liquefied natural gas (PLNG), and more particularly, to such systems including containers that are constructed from an ultra-high strength, low alloy steel containing less than 9 wt % nickel and having a tensile strength greater than 830 MPa (120 ksi) and a DBTT lower than about $-73°$ C. ($-100°$ F.).

BACKGROUND OF THE INVENTION

Various terms are defined in the following specification. For convenience, a Glossary of terms is provided herein, immediately preceding the claims.

Many sources of natural gas are located in remote areas, great distances from any commercial markets for the gas. Sometimes a pipeline is available for transporting produced natural gas to a commercial market. When pipeline transportation to a commercial market is not feasible, produced natural gas is often processed into LNG for transport to market. The LNG is typically transported via specially built tanker ships, and then stored and revaporized at an import terminal near the market. The equipment used to liquefy, transport, store, and revaporize natural gas is generally quite expensive; and a typical conventional LNG project can cost from $5 billion to $10 billion, including field development costs. A typical "grass roots" LNG project requires a minimum natural gas resource of about 280 Gm$^3$ (10 TCF (trillion cubic feet)) and the LNG customers are generally large utilities. Often, natural gas resources discovered in remote areas are smaller than 280 Gm$^3$ (10 TCF). Even for natural gas resource bases that meet the 280 Gm$^3$ (10 TCF) minimum, very long-term commitments of 20 years or more from all involved, i.e., the LNG supplier, the LNG shipper, and the large utility LNG customer, are required to economically process, store, and transport the natural gas as LNG. Where potential LNG customers have an alternative source of gas, such as pipeline gas, the conventional LNG chain of delivery is often not economically competitive.

A conventional LNG plant produces LNG at temperatures of about $-162°$ C. ($-260°$ F.) and at atmospheric pressure. A typical natural gas stream enters a conventional LNG plant at pressures from about 4830 kPa (700 psia) to about 7600 kPa (1100 psia) and temperatures from about 21° C. (70° F.) to about 38° C. (100° F.). Up to about 350,000 refrigeration horsepower are needed to reduce the temperature of the natural gas to the very low outlet temperature of about $-162°$ C. ($-260°$ F.) in a conventional two-train LNG plant. Water, carbon dioxide, sulfur-containing compounds, such as hydrogen sulfide, other acid gases, n-pentane and heavier hydrocarbons, including benzene, must be substantially removed from the natural gas during conventional LNG processing, down to parts-per-million (ppm) levels, or these compounds will freeze, causing plugging problems in the process equipment. In a conventional LNG plant, gas treating equipment is required to remove the carbon dioxide and acid gases. The gas treating equipment typically uses a chemical and/or physical solvent regenerative process and requires a significant capital investment. Also, the operating expenses are high in relation to those for other equipment in the plant. Dry bed dehydrators, such as molecular sieves, are required to remove the water vapor. The scrub column and fractionation equipment are used to remove the hydrocarbons that tend to cause plugging problems. Mercury is also removed in a conventional LNG plant since it can cause failures in equipment constructed of aluminum. In addition, a large portion of the nitrogen that may be present in natural gas is removed after processing since nitrogen will not remain in the liquid phase during transport of conventional LNG and having nitrogen vapors in LNG containers at the point of delivery is undesirable.

Containers, piping, and other equipment used in a conventional LNG plant are typically constructed, at least in part, from aluminum or nickel-containing steel (e.g., 9 wt % nickel), to provide the necessary fracture toughness at the extremely cold processing temperatures. Expensive materials with good fracture toughness at low temperatures, including aluminum and commercial nickel-containing steel (e.g., 9 wt % nickel), are typically used to contain the LNG in the LNG ships and at the import terminals, in addition to their use in the conventional plant.

A typical conventional LNG ship utilizes large spherical containers, known as Moss spheres, to store the LNG during transport. These ships currently cost more than about $230 million each. A typical conventional project to produce LNG in the Middle East and transport it to the Far East might require 7 to 8 of these ships for a total cost of about $1.6 billion to $2.0 billion.

As can be determined from the above discussion, the need exists for a more economical system for processing, storing, and transporting LNG to commercial markets to allow remote natural gas resources to compete more effectively with alternative energy supplies. Furthermore, a system is needed to commercialize smaller remote natural gas resources that would otherwise be uneconomical to develop. In addition, a more economical gasification and distribution system is needed so that LNG can be made economically attractive to smaller consumers.

Consequently, the primary objects of the present invention are to provide a more economical system for processing, storing, and transporting LNG from remote sources to commercial markets and to substantially reduce the threshold size of both the reserve and the market required to make an LNG project economically feasible. One way to accomplish these objects would be to process the LNG at higher pressures and temperatures than is done in a conventional LNG plant, i.e., at pressures higher than atmospheric pressure and temperatures higher than $-162°$ C. ($-260°$ F.). While the general concept of processing, storing, and transporting LNG at increased pressures and temperatures has been discussed in industry publications, these publications generally discuss constructing transportation containers from nickel-containing steel (e.g., 9 wt % nickel) or aluminum, both of which may meet design requirements but are very expensive materials. For example, at pp. 162–164 of his book *NATURAL GAS BY SEA The Development of a New Technology*, published by Witherby & Co. Ltd., first edition 1979, second edition 1993, Roger Ffooks discusses the conversion of the Liberty ship Sigalpha to carry either MLG (medium condition liquefied gas) at 1380 kPa (200 psig) and $-115°$ C. ($-175°$ F.), or CNG (compressed natural gas) processed at 7935 kPa (1150 psig) and $-60°$ C. ($-75°$ F.). Mr. Ffooks indicates that although technically proven, neither of the two concepts found 'buyers'—largely due to the high cost of storage. According to a paper on the subject referenced by Mr. Ffooks, for CNG service, i.e., at −60° C. (−75° F.), the design target was a low alloy, weldable, quenched and tempered steel with good strength (760 MPa (110 ksi)) and good fracture toughness at operating conditions. (See "A new process for the transportation of natural gas" by R. J. Broeker, International LNG Conference, Chicago, 1968.) This paper also indicates that an aluminum alloy was the lowest cost alloy for MLG service, i.e., at the much lower temperature of −115° C. (−175° F.). Also, Mr. Ffooks discusses, at p. 164, the Ocean Phoenix Transport design, working at a much lower pressure of about 414 kPa (60 psig), with tanks that could be constructed of 9 percent nickel steel or aluminum alloy; and indicates that, again, the concept did not appear to offer sufficient technical or financial advantages to become commercialized. See also: (i) U.S. Pat. No. 3,298,805, which discusses the use of a 9% nickel content steel or a high strength aluminum alloy for making containers for the transport of a compressed natural gas; and (ii) U.S. Pat. No. 4,182,254, which discusses tanks of 9% nickel or similar steel for the transport of LNG at temperatures from −100° C. (−148° F.) to −140° C. (−220° F.) and pressures of 4 to 10 atmospheres (i.e., of 407 kPa (59 psia) to 1014 kPa (147 psia)); (iii) U.S. Pat. No. 3,232,725, which discusses transportation of a natural gas in a dense phase single-fluid state at a temperature as low as −62° C. (−80° F.), or in some cases −68° C. (−90° F.), and at pressures at least 345 kPa (50 psi) above the boiling point pressure of the gas at operating temperatures, using containers constructed from materials such as 1 to 2 percent nickel steel which has been quenched and tempered to secure an ultimate tensile strength approaching 120,000 psi; and (iv) "Marine Transportation of LNG at Intermediate Temperature", CME March 1979, by C. P. Bennett, which discusses a case study of transport of LNG at a pressure of 3.1 MPa (450 psi) and a temperature of −100° C. (−140° F.) using a storage tank constructed from a 9% Ni steel or a 3½% Ni quenched and tempered steel and having 9½ inch thick walls.

Although these concepts are discussed in industry publications, to our knowledge, LNG is not currently commercially processed, stored, and transported at pressures substantially higher than atmospheric pressure and temperatures substantially higher than −162° C. (−260° F.). This is likely due to the fact that an economical system for processing, storing, transporting, and distributing LNG at such pressures and temperatures, both via sea and via land, has not heretofore been made commercially available.

Nickel-containing steels conventionally used for cryogenic temperature structural applications, e.g., steels with nickel contents of greater than about 3 wt %, have low DBTTs (a measure of toughness, as defined herein), but also have relatively low tensile strengths. Typically, commercially available 3.5 wt % Ni, 5.5 wt % Ni, and 9 wt % Ni steels have DBTTs of about −100° C. (−150° F.), −155° C. (−250° F.), and −175° C. (−280° F.), respectively, and tensile strengths of up to about 485 MPa (70 ksi), 620 MPa (90 ksi), and 830 MPa (120 ksi), respectively. In order to achieve these combinations of strength and toughness, these steels generally undergo costly processing, e.g., double annealing treatment. In the case of cryogenic temperature applications, industry currently uses these commercial nickel-containing steels because of their good toughness at low temperatures, but must design around their relatively low tensile strengths. The designs generally require excessive steel thicknesses for load-bearing, cryogenic temperature applications. Thus, use of these nickel-containing steels in load-bearing, cryogenic temperature applications tends to be expensive due to the high cost of the steel combined with the steel thicknesses required.

Five co-pending U.S. provisional patent applications (the "PLNG Pat. No. Applications"), each entitled "Improved System for Processing, Storing, and Transporting Liquefied Natural Gas", describe containers and tanker ships for storage and marine transportation of pressurized liquefied natural gas (PLNG) at a pressure in the broad range of about 1035 kPa (150 psia) to about 7590 kPa (1100 psia) and at a temperature in the broad range of about −123° C. (−190° F.) to about −62° C. (−80° F.). The most recent of said PLNG Patent Applications has a priority date of May 14, 1998 and is identified by the applicants as Docket No. 97006P4 and by the U.S. Patent and Trademark Office ("USPTO") as application Ser. No. 60/085467. The first of said PLNG Patent Applications has a priority date of Jun. 20, 1997 and is identified by the USPTO as application Ser. No. 60/050280. The second of said PLNG Patent Applications has a priority date of Jul. 28, 1997 and is identified by the USPTO as application Ser. No. 60/053966. The third of said PLNG Patent Applications has a priority date of Dec. 19, 1997 and is identified by the USPTO as application Ser. No. 60/068226. The fourth of said PLNG Patent Applications has a priority date of Mar. 30, 1998 and is identified by the USPTO as application Ser. No. 60/079904. However, the PLNG Patent Applications do not describe systems for vehicular, land-based distribution of PLNG. As used herein, "vehicular, land-based distribution of PLNG" means distribution of PLNG from central processing or storage facilities to end-user or storage facilities primarily over land, such as by truck, railcar, or barge through existing road, railroad, and land-locked water systems.

LNG is routinely distributed from central processing or storage facilities to end-user sites by truck, railcar, or barge through existing road, railroad, and land-locked water systems. Other cryogenic fluids, such as liquid oxygen, liquid hydrogen, and liquid helium are also routinely distributed by these means. The market for LNG, in particular, has grown in recent years because of the clean-burning characteristics of natural gas. To meet this increasing market demand, delivery of produced natural gas in the form of PLNG, as compared to LNG, can be beneficial to the end-user because the PLNG is more economically processed, provided that an economical means for transporting and delivering the PLNG is made available. Additionally, as compared to CNG, the higher liquid density of PLNG translates into higher product mass or energy for a given volume.

Carbon steels that are commonly used in construction of commercially available containers for fluids do not have adequate fracture toughness at cryogenic temperatures, i.e., temperatures lower than about −40° C. (−40° F.). Other materials with better cryogenic temperature fracture toughness than carbon steel, e.g., commercial nickel-containing steels (3½ wt % Ni to 9 wt % Ni) with tensile strengths up to about 830 MPa (120 ksi), aluminum (Al-5083 or Al-5085), or stainless steel are traditionally used to construct commercially available containers that are subject to cryogenic temperature conditions. Also, specialty materials such as titanium alloys and special epoxy-impregnated woven fiberglass composites are sometimes used. However, containers constructed from these materials often lack adequate strength at traditional wall thicknesses, e.g., about 2.5 cm (1 inch), to contain pressurized, cryogenic temperature fluids, so wall thicknesses of such containers must be increased to add strength. This adds weight to the containers that must be supported and transported, often at significant added cost to a project. Additionally, these materials tend to be more expensive than standard carbon steels. The added cost for support and transport of the thick-walled containers combined with the increased cost of the material for construction can often make projects economically unattractive. These disadvantages make currently commercially available materials economically unattractive for constructing containers and systems for vehicular, land-based distribution of PLNG. The discovery of containers suitable for marine transport of PLNG, as discussed in the PLNG Patent Applications, combined with current capabilities for processing PLNG, make eminent the need for systems for economically attractive vehicular, land-based distribution of PLNG. A significant portion of vehicular, land-based distribution cost is the capital cost associated with vehicle container design and fabrication. A significant cost reduction in the vehicle container cost would ultimately translate into an overall improvement in the economics of vehicular, land-based transportation of PLNG, as well as that of LNG and other cryogenic fluids.

The availability of a more cost-effective source of natural gas transported and distributed in the form of a liquid would provide a significant advancement in the ability to utilize natural gas as a fuel source. The following are brief descriptions of existing and emerging applications that use natural gas for energy and that would benefit significantly from the availability of a more economical system for transportation and distribution of natural gas in the form of PLNG.

LNG is routinely trucked to meet fuel needs at remote sites where the infrastructure for natural gas distribution does not exist. Additionally, local conditions are increasingly making transported LNG a competitive economic alternative to gas pipelines for several major energy projects. An Alaskan gas company has proposed a $200 Million project for remote LNG baseload systems in seventeen communities in southeastern Alaska. The company also expects to truck LNG 300 miles from a liquefaction plant on Cook Inlet to Fairbanks starting in November, 1997. In eastern Arizona, a recent feasibility study has shown that remote baseload LNG supply facilities may offer an attractive lower-cost energy solution to a number of isolated communities without current access to gas pipelines. In addition to trucks and barges, railcars may also be used to transport LNG. These represent new trends in large-volume LNG transportation and usage with potential for substantial growth. The emerging PLNG technology could make economically feasible the use of PLNG as fuel in these and other similar land-based applications, if a more economical means of vehicular, land-based distribution of PLNG, were available.

Secondly, trucking LNG to meet fuel needs of certain manufacturing plants has also become a competitive economical alternative. The most recent example is a company in Hampton, N.H., which switched from a gas-supply contract with propane as a back-up to the exclusive use of LNG to run a 4,000 horsepower engine for electric power generation and to operate two process boilers on vaporized LNG. Again, further improvements in distribution costs would likely result in an increased number of similar applications.

Further, there is an increasing growth in the use of 'portable pipeline'—transportable LNG/vaporizer—systems to maintain continuous uninterrupted gas supply. This is to help gas companies avoid service interruption and to continue the flow of natural gas to customers during peak demand periods, such as cold winter days, emergency from a damaged underground pipe, maintenance on a gas system, etc. Depending on the particular application, an LNG vaporizer may be installed or located at a strategic spot on the natural gas distribution system, and when operating conditions warrant, LNG tanker trucks are brought in to provide the LNG that is vaporized. Currently, to our knowledge, there are no commercial tanker trucks for transporting PLNG, instead of LNG, to such a vaporizer for providing additional gas during peak demands.

Finally, there are projections that several of the current and future major LNG importers in Asia offer the most potential for LNG use as vehicle fuel (as much as 20% of imports). Trucking of LNG to the refueling stations may be the most attractive economic option depending on local conditions. In particular, in the absence of an existing infrastructure for gas distribution, cost-effective tanker design may make PLNG, distribution (by truck, railcar, or barge through existing road, rail, and land-locked water systems) a more attractive and economic alternative.

A need exists for economical systems for vehicular, land-based distribution of PLNG to allow remote natural gas resources to compete more effectively with alternative energy supplies. Additionally, a need exists for more economical systems for vehicular, land-based distribution of LNG and other cryogenic fluids. As used hereinafter, the term "tanker truck" is meant to include any means for vehicular, land-based distribution of PLNG, LNG, or other cryogenic fluids, including without limitation, tanker trailers, railcars, and barges.

Therefore, a particular object of the present invention is to provide economical systems for vehicular, land-based distribution of LNG at substantially increased pressures and temperatures over conventional LNG systems. Another object of the present invention is to provide such systems having storage containers and other components that are constructed from materials having adequate strength and fracture toughness to contain said pressurized liquefied natural gas.

SUMMARY OF THE INVENTION

Consistent with the above-stated objects of the present invention, systems are provided for vehicular, land-based distribution of pressurized liquefied natural gas (PLNG) at a pressure in the range of about 1035 kPa (150 psia) to about 7590 kPa (1100 psia) and at a temperature in the range of about −123° C. (−190° F.) to about −62° C. (−80° F.). The systems of this invention have containers and other components that are constructed from materials comprising an ultra-high strength, low alloy steel containing less than 9 wt % nickel and having adequate strength and fracture toughness to contain said pressurized liquefied natural gas. The steel has an ultra-high strength, e.g., tensile strength (as defined herein) greater than 830 MPa (120 ksi), and a DBTT (as defined herein) lower than about −73° C. (−100° F.).

BRIEF DESCRIPTION OF THE DRAWINGS

The advantages of the present invention will be better understood by referring to the following detailed description and the attached drawings in which.

Figure 1:
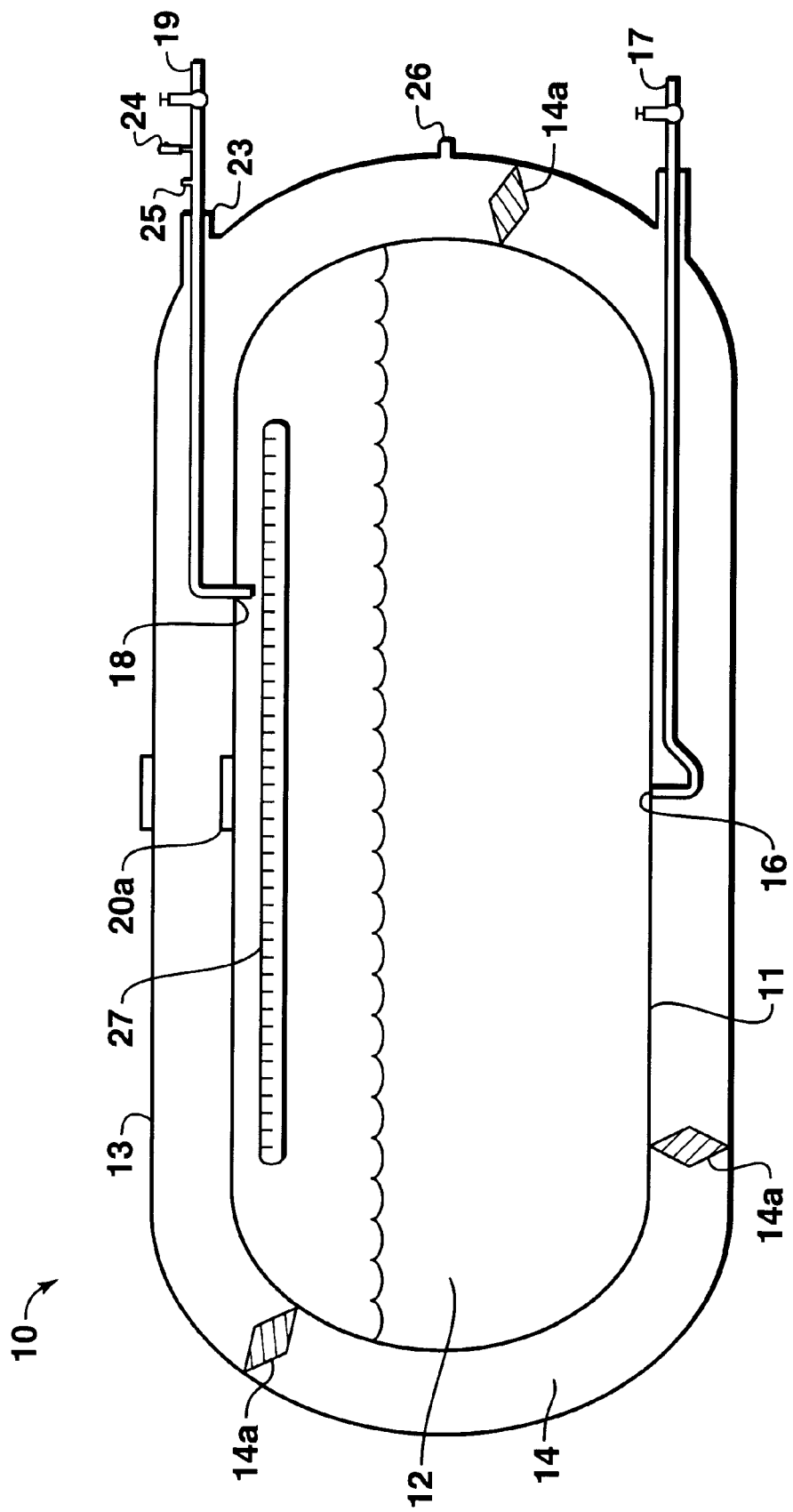
FIG. 1 illustrates a tanker truck storage and transportation container according to the present invention.

While the invention will be described in connection with its preferred embodiments, it will be understood that the invention is not limited thereto. On the contrary, the invention is intended to cover all alternatives, modifications, and equivalents which may be included within the spirit and scope of the invention, as defined by the appended claims.

DETAILED DESCRIPTION OF THE INVENTION

The present invention relates to systems for vehicular, land-based distribution of PLNG. Systems are provided for distributing pressurized liquefied natural gas (PLNG) at a pressure of about 1035 kPa (150 psia) to about 7590 kPa (1100 psia) and at a temperature of about −123° C. (−190° F.) to about −62° C. (−80° F.), wherein the systems have containers and other components that are constructed from materials comprising an ultra-high strength, low alloy steel containing less than 9 wt % nickel and having a tensile strength greater than 830 MPa (120 ksi) and a DBTT lower than about −73° C. (−100° F.). Further, systems are provided for distributing pressurized liquefied natural gas at a pressure of about 1725 kPa (250 psia) to about 4830 kPa (700 psia) and at a temperature of about −112° C. (−170° F.) to about −79° C. (−110° F.), wherein the systems have containers and other components that (i) are constructed from materials comprising an ultra-high strength, low alloy steel containing less than 9 wt % nickel and (ii) have adequate strength and fracture toughness to contain said pressurized liquefied natural gas. Additionally, a tanker truck is provided for transporting PLNG, wherein said tanker truck has at least one storage container that is constructed from materials comprising an ultra-high strength, low alloy steel containing less than 9 wt % nickel and having a tensile strength greater than 830 MPa (120 ksi) and a DBTT lower than about −73° C. (−100° F.) or at least one storage container that (i) is constructed from materials comprising an ultra-high strength, low alloy steel containing less than 9 wt % nickel and (ii) has adequate strength and fracture toughness to contain said pressurized liquefied natural gas.

Containers

The key to achieving the systems of the present invention are containers suitable for use in a tanker truck for transporting PLNG at a pressure of about 1035 kPa (150 psia) to about 7590 kPa (1100 psia) and at a temperature of about −123° C. (−190° F.) to about −62° C. (−80° F.). Preferably, PLNG is produced and transported at a pressure in the range of about 1725 kPa (250 psia) to about 7590 kPa (1100 psia) and at a temperature in the range of about −112° C. (−170° F.) to about −62° C. (−80° F.). More preferably, PLNG is produced and transported at a pressure in the range of about 2415 kPa (350 psia) to about 4830 kPa (700 psia) and at a temperature in the range of about −101° C. (−150° F.) to about −79° C. (−110° F). Even more preferably, the lower ends of the pressure and temperature ranges for PLNG are about 2760 kPa (400 psia) and about −96° C. (−140° F.). A container is provided for storing and transporting the PLNG, wherein the container is constructed from a material comprising an ultra-high strength, low alloy steel containing less than 9 wt % nickel and having a tensile strength greater than 830 MPa (120 ksi) and a DBTT lower than about −73° C. (−100° F.).

Preferably the container of this invention is designed to minimize heat leakage into the stored PLNG, i.e., to minimize vaporization of the stored PLNG, so that most of the stored PLNG remains in the liquid state for delivery. In one embodiment that utilizes the Dewar concept, the container consists of an inner vessel suspended within an outer vessel and separated from the outer vessel by a space that is evacuated or contains insulation. Referring to FIG. 1, container 10 of this embodiment comprises inner vessel 11, which contains PLNG 12 and is enclosed by outer vessel 13. Space 14 between inner vessel 11 and outer vessel 13 is initially evacuated and is preferably maintained at vacuum to minimize heat leakage due to convection. The vacuum is maintained primarily by ensuring leak tightness, using techniques known to those skilled in the art. A high-emissivity coating or other surface treatment is provided on the outer surface 15 of inner vessel 11 to minimize radiation heat transfer into inner vessel 11. For purposes of example only, without thereby limiting this invention, outer surface 15 may be covered by a single layer wrap of aluminized mylar to minimize radiation heat transfer into inner vessel 11. Alternatively, space 14 may be filled with a packing of multi-layer insulation (not shown in FIG. 1) to minimize both radiation and convection heat transfer into inner vessel 11. Additionally, conduction heat leak is minimized, preferably (i) by minimizing the number of penetrations into inner vessel 11 and, therefore, the number of conduction heat paths, (ii) by using high-insulating materials, and (iii) by judicious design of support suspension system members. As indicated in FIG. 1, a minimum of two penetrations into inner vessel 11 are needed. A fill and drain line 17, and opening 16 therefor, are required for loading and unloading liquid product to and from inner vessel 11. A vent line 19, and opening 18 therefor, are required to release vapor formed as a result of heat leak into inner vessel 11. These openings 16 and 18, fill and drain line 17, and vent line 19 are sources of heat leakage into inner vessel 11. In order to minimize conduction heat leakage, fill and drain line 17 and vent line 19 are preferably designed with wall thicknesses minimized and lengths maximized. An access manway 20 into inner vessel 11 is provided for inspection and maintenance purposes. Access manway 20 is preferably covered with a securely bolted cover 20a. Preferably, space 14 between inner vessel 11 and outer vessel 13 is minimized. However, the wall of inner vessel 11 is preferably isolated from the wall of outer vessel 13, e.g., so that the walls do not contact each other. One method for providing this isolation is by placing spacers 14a, preferably insulating spacers, between the wall of inner vessel 11 and the wall of outer vessel 13. In one embodiment, the desired length of vent line 19 is achieved by providing a stand-off 23 at outer vessel 13 to extend space 14 around vent line 19. Alternatively, an appropriate bend in vent line 19 may be adequate to increase the length of vent line 19 and still allow for contraction during cooldown. Anti-slosh baffles (not shown in FIG. 1) are preferably provided to damp motion of PLNG 12 during transit.

Suspension System

In addition to the aforementioned storage containers for storing and transporting PLNG, another desirable component of the tanker trucks of this invention is a suspension system. Preferably, the suspension system provides support of the inner vessel and its contents against static loads, when the tanker truck is stationary, and against dynamic loads, when the tanker truck is in motion. Typical acceleration loads specified in the design of suspension systems for large cryogenic fluid storage containers on a trailer or tanker truck are: one g for the vertical upward direction, four g for the vertical downward direction, two g for the transverse direction, and four g for the longitudinal direction (where g is the local acceleration due to gravity). One way to provide the strength needed to support such loads is to increase the cross-sectional area of the structural support members; however, increasing the cross-sectional area typically results in an undesirable increase in the rate of thermal conduction to the inner vessel. Thus judicious design of the support system is critical for minimizing conduction heat leakage into the inner vessel.

Figure 2:
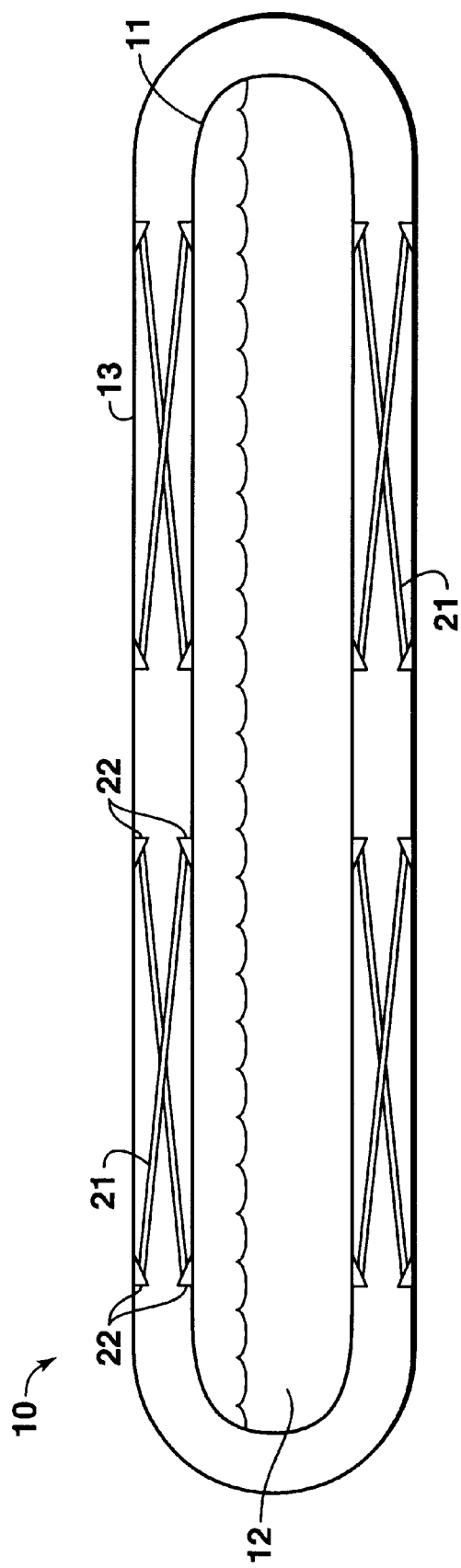
FIG. 2 illustrates a suspension system for a tanker truck storage and transportation container according to the present invention.

Referring now to FIG. 2, without thereby limiting this invention, an example suspension system for container 10 illustrates the use of support rods 21 under tension. In this particular example, materials with low thermal conductivity but high strength (such as G-10 plastics) are used to fabricate support rods 21 for supporting inner vessel 11 and are preferably loaded in tension only. Support rings 22 are provided to attach support rods 21 to the outer wall of inner vessel 11 and to the inner wall of outer vessel 13. In one embodiment, plastic washers (not shown in FIG. 2), designed for thermal isolation, are used along with support rings 22 to provide thermal isolation when the thermal conductivity of support rods 21 is too high to minimize heat leakage into inner vessel 11, or to at least limit heat leakage into inner vessel 11 to no greater than a target value. Methods for determining the target value for heat leakage and how to limit heat leakage to no greater than the target value may be determined by those skilled in the art given this disclosure and standard industry publications. For typical transport trailers for large containers, the dynamic loads on support rods 21 is likely to be varied and substantial. These factors, as well as other factors familiar to those skilled in the art, are preferably taken into account in design of a storage container according to the present invention.

Safety System

Referring again to FIG. 1, safety devices are preferably provided on storage container 10 according to the present invention. Typically an inner vessel 11 pressure relief valve 24 and burst disc assembly 25 are provided in-line on vent line 19. A burst disc assembly (not shown on FIG. 1) may also be provided for space 14 between inner vessel 11 and outer vessel 13.

Loading and Unloading Operations

Initial Filling Operations:

Referring again to FIG. 1, fill and drain line 17 is used to fill inner vessel 11 of container 10 with PLNG. Prior to initial filling, inner vessel 11 of container 10 is typically at atmospheric pressure and ambient temperature. The initial filling of inner vessel 11 is preferably conducted according to a prescribed sequence to allow for inner vessel 11 to reach thermal equilibrium at the desired PLNG storage temperature. In one embodiment, the prescribed sequence includes the following steps in the order set forth. First, in a cooldown cycle for inner vessel 11, vapor PLNG is allowed to flow into inner vessel 11 from the PLNG source through a vapor transfer line (not shown in FIG. 1) connected to vent line 19. Gas header 27 is provided to disperse the vapor PLNG flowing into inner vessel 11 and minimize impingement of the vapor PLNG against the walls of inner vessel 11. This flow of vapor PLNG is continued until the temperature in inner vessel 11 reaches a pre-established temperature value. The pre-established temperature value is derived primarily from the cooldown curve and thermal contraction characteristics of the material from which inner vessel 11 is constructed, and may be determined by those skilled in the art by reference to standard industry publications. The pressure in inner vessel 11 is simultaneously built up by the flow of vapor PLNG. Next, liquid PLNG is allowed to flow into inner vessel 11 for the final phase of the cooldown cycle. A liquid transfer line (not shown in FIG. 1) from the PLNG source is connected to fill and drain line 17. In one embodiment of the present invention, at least one cryogenic pump (not shown in FIG. 1) at the PLNG source is used to pump liquid PLNG into inner vessel 11 of container 10, preferably at a low flow rate, preferably considerably lower than about 0.76 cubic meters per minute (200 gallons per minute). As the liquid PLNG further cools inner vessel 11, the liquid PLNG vaporizes and contributes to the pressure build-up. Flow of vapor PLNG reverses through vent line 19 to the PLNG source after the pressure reaches a pre-established pressure value based on the pressure differential between the inner vessel 11 and the PLNG source. When the temperature in container 10 reaches a pre-established operating temperature value, i.e., as the cooldown cycle is completed, liquid PLNG is pumped into inner vessel 11 of container 10 from the PLNG source, preferably at a flow rate of at least about 0.76 cubic meters per minute (200 gallons per minute), displacing a substantially equal volume of vapor PLNG from inner vessel 11 back into the PLNG source. In this embodiment, pumping of liquid PLNG and displacement of vapor PLNG continues until liquid PLNG in inner vessel 11 has reached a pre-set amount or volume, e.g., as detected by a liquid level sensor such as a tuned densitometer (not shown in the drawings), at which time the following operations are conducted in any reasonable order: (i) pumping of liquid PLNG is stopped, (ii) flow of liquid PLNG through fill and drain line 17 is ceased, e.g., by the closing of a valve (not shown in FIG. 1) in fill and drain line 17, (iii) fill and drain line 17 is disconnected from the liquid transfer line, (iv) flow of vapor PLNG through vent line 19 is ceased, e.g., by the closing of a valve (not shown in FIG. 1) in vent line 19, and (v) vent line 19 is disconnected from the vapor transfer line. As with cryogenic fluid storage containers generally, a minimum of about 10% vapor space is preferably available in container 10 during, and upon completion of, loading, as is familiar to those skilled in the art of cryogenic fluid storage.

Refilling/Offloading Operations:

Referring again to FIG. 1, fill and drain line 17 is used to fill container 10 with PLNG. A liquid transfer line (not shown in FIG. 1) from the PLNG source is connected to fill and drain line 17. In one embodiment of the present invention, at least one cryogenic pump (not shown in FIG. 1) at the PLNG source is used to pump liquid PLNG into inner vessel 11 of container 10, preferably at a flow rate of at least about 0.76 cubic meters per minute (200 gallons per minute). Vapor PLNG from inner vessel 11 is returned to the PLNG source through a vapor transfer line (not shown in FIG. 1) connected to vent line 19. Also in this embodiment, to offload liquid PLNG from inner vessel 11, at least one cryogenic pump is provided at the offloading facility (not shown in FIG. 1) to pump liquid PLNG through fill and drain line 17 while vapor PLNG is returned to inner vessel 11 through vent line 19. Pressure equilibration is maintained by the direct interconnection of the liquid and vapor phases in inner vessel 11 and in the offloading facility. In this embodiment, pumping of liquid PLNG and displacement of vapor PLNG continues until liquid PLNG in the storage container at the offloading facility has reached a pre-set amount or volume, e.g., as detected by a level sensor, at which time the following operations are conducted in any reasonable order: (i) pumping of liquid PLNG is stopped, (ii) flow of liquid PLNG through fill and drain line 17 is ceased, e.g., by the closing of a valve (not shown in FIG. 1) in fill and drain line 17, (iii) fill and drain line 17 is disconnected from the liquid transfer line, (iv) flow of vapor PLNG through vent line 19 is ceased, e.g., by the closing of a valve (not shown in FIG. 1) in vent line 19, and (v) vent line 19 is disconnected from the vapor transfer line.

The offloading scheme described above is used for applications which involve offloading PLNG from the tanker truck into a PLNG storage container or containers. These applications include, for example, without thereby limiting this invention, use of PLNG as vehicular fuel, storage at a remote facility for subsequent use as fuel, or storage in a manufacturing facility for subsequent use either as fuel or other feedstock. For applications where storage as a liquid is not available, the PLNG is vaporized, for example, without thereby limiting this invention, to meet fuel needs directly or to be stored as a gas or to feed a pipeline. In such cases, a vaporization system is preferably provided at the offloading site. A typical vaporization system at the receiving or offloading site will include cryogenic pumps for offloading PLNG from the tanker truck and pumping the liquid to the required delivery pressure, if needed, and a vaporization system for converting the liquid to vapor. These are standard items that are known to anyone skilled in the art.

Steel for Construction of Containers and Other Components

Any ultra-high strength, low alloy steel containing less than 9 wt % nickel and having adequate toughness for containing cryogenic temperature fluids, such as PLNG, at operating conditions, according to known principles of fracture mechanics as described herein, may be used for constructing the containers and other components of this invention. An example steel for use in the present invention, without thereby limiting the invention, is a weldable, ultra-high strength, low alloy steel containing less than 9 wt % nickel and having a tensile strength greater than 830 MPa (120 ksi) and adequate toughness to prevent initiation of a fracture, i.e., a failure event, at cryogenic temperature operating conditions. Another example steel for use in the present invention, without thereby limiting the invention, is a weldable, ultra-high strength, low alloy steel containing less than about 3 wt % nickel and having a tensile strength of at least about 1000 MPa (145 ksi) and adequate toughness to prevent initiation of a fracture, i.e., a failure event, at cryogenic temperature operating conditions. Preferably these example steels have DBTTs of lower than about –73° C. (–100° F.).

Recent advances in steel making technology have made possible the manufacture of new, ultra-high strength, low alloy steels with excellent cryogenic temperature toughness. For example, three U.S. patents issued to Koo et al., Pat. Nos. 5,531,842, 5,545,269, and 5,545,270, describe new steels and methods for processing these steels to produce steel plates with tensile strengths of about 830 MPa (120 ksi), 965 MPa (140 ksi), and higher. The steels and processing methods described therein have been improved and modified to provide combined steel chemistries and processing for manufacturing ultra-high strength, low alloy steels with excellent cryogenic temperature toughness in both the base steel and in the heat affected zone (HAZ) when welded. These ultra-high strength, low alloy steels also have improved toughness over standard commercially available ultra-high strength, low alloy steels. The improved steels are described in a co-pending U.S. provisional patent application entitled "ULTRA-HIGH STRENGTH STEELS WITH EXCELLENT CRYOGENIC TEMPERATURE TOUGHNESS", which has a priority date of Dec. 19, 1997 and is identified by the United States Patent and Trademark Office ("USPTO") as application Ser. No. 60/068194; in a co-pending U.S. provisional patent application entitled "ULTRA-HIGH STRENGTH AUSAGED STEELS WITH EXCELLENT CRYOGENIC TEMPERATURE TOUGHNESS", which has a priority date of Dec. 19, 1997 and is identified by the USPTO as application Ser. No. 60/068252, and in a co-pending U.S. provisional patent application entitled "ULTRA-HIGH STRENGTH DUAL PHASE STEELS WITH EXCELLENT CRYOGENIC TEMPERATURE TOUGHNESS", which has a priority date of Dec. 19, 1997 and is identified by the USPTO as application Ser. No. 60/068816. (collectively, the "Steel Patent Applications").

The new steels described in the Steel Patent Applications, and further described in the examples below, are especially suitable for constructing the containers for storing and transporting PLNG of this invention in that the steels have the following characteristics, preferably for steel plate thicknesses of about 2.5 cm (1 inch) and greater: (i) DBTT lower than about –73° C. (–100° F.), preferably lower than about –107° C. (–160° F.), in the base steel and in the weld HAZ; (ii) tensile strength greater than 830 MPa (120 ksi), preferably greater than about 860 MPa (125 ksi), and more preferably greater than about 900 MPa (130 ksi); (iii) superior weldability; (iv) substantially uniform through-thickness microstructure and properties; and (v) improved toughness over standard, commercially available, ultra-high strength, low alloy steels. Even more preferably, these steels have a tensile strength of greater than about 930 MPa (135 ksi), or greater than about 965 MPa (140 ksi), or greater than about 1000 MPa (145 ksi).

First Steel Example

As discussed above, a copending U.S. provisional patent application, having a priority date of Dec. 19, 1997, entitled "Ultra-High Strength Steels With Excellent Cryogenic Temperature Toughness", and identified by the USPTO as application Ser. No. 60/068194, provides a description of steels suitable for use in the present invention. A method is provided for preparing an ultra-high strength steel plate having a microstructure comprising predominantly tempered fine-grained lath martensite, tempered fine-grained lower bainite, or mixtures thereof, wherein the method comprises the steps of (a) heating a steel slab to a reheating temperature sufficiently high to (i) substantially homogenize the steel slab, (ii) dissolve substantially all carbides and carbonitrides of niobium and vanadium in the steel slab, and (iii) establish fine initial austenite grains in the steel slab; (b) reducing the steel slab to form steel plate in one or more hot rolling passes in a first temperature range in which austenite recrystallizes; (c) further reducing the steel plate in one or more hot rolling passes in a second temperature range below about the $T_{nr}$ temperature and above about the $Ar_3$ transformation temperature; (d) quenching the steel plate at a cooling rate of about 10° C. per second to about 40° C. per second (18° F./sec–72° F./sec) to a Quench Stop Temperature below about the $M_s$ transformation temperature plus 200° C. (360° F.); (e) stopping the quenching; and (f) tempering the steel plate at a tempering temperature from about 400° C. (752° F.) up to about the $Ac_1$ transformation temperature, preferably up to, but not including, the $Ac_1$ transformation temperature, for a period of time sufficient to cause precipitation of hardening particles, i.e., one or more of ε-copper, $Mo_2C$, or the carbides and carbonitrides of niobium and vanadium. The period of time sufficient to cause precipitation of hardening particles depends primarily on the thickness of the steel plate, the chemistry of the steel plate, and the tempering temperature, and can be determined by one skilled in the art. (See Glossary for definitions of predominantly, of hardening particles, of $T_{nr}$ temperature, of $Ar_3$, $M_s$, and $Ac_1$ transformation temperatures, and of $Mo_2C$.)

To ensure ambient and cryogenic temperature toughness, steels according to this first steel example preferably have a microstructure comprised of predominantly tempered fine-grained lower bainite, tempered fine-grained lath martensite, or mixtures thereof. It is preferable to substantially minimize the formation of embrittling constituents such as upper bainite, twinned martensite and MA. As used in this first steel example, and in the claims, "predominantly" means at least about 50 volume percent. More preferably, the microstructure comprises at least about 60 volume percent to about 80 volume percent tempered fine-grained lower bainite, tempered fine-grained lath martensite, or mixtures thereof. Even more preferably, the microstructure comprises at least about 90 volume percent tempered fine-grained lower bainite, tempered fine-grained lath martensite, or mixtures thereof. Most preferably, the microstructure comprises substantially 100% tempered fine-grained lath martensite.

A steel slab processed according to this first steel example is manufactured in a customary fashion and, in one embodiment, comprises iron and the following alloying elements, preferably in the weight ranges indicated in the following Table I:

TABLE I

| Alloying Element | Range (wt %) |
|---|---|
| carbon (C) | 0.04–0.12, more preferably 0.04–0.07 |
| manganese (Mn) | 0.5–2.5, more preferably 1.0–1.8 |
| nickel (Ni) | 1.0–3.0, more preferably 1.5–2.5 |
| copper (Cu) | 0.1–1.5, more preferably 0.5–1.0 |
| molybdenum (Mo) | 0.1–0.8, more preferably 0.2–0.5 |
| niobium (Nb) | 0.02–0.1, more preferably 0.03–0.05 |
| titanium (Ti) | 0.008–0.03, more preferably 0.01–0.02 |
| aluminum (Al) | 0.001–0.05, more preferably 0.005–0.03 |
| nitrogen (N) | 0.002–0.005, more preferably 0.002–0.003 |

Vanadium (V) is sometimes added to the steel, preferably up to about 0.10 wt %, and more preferably about 0.02 wt % to about 0.05 wt %.

Chromium (Cr) is sometimes added to the steel, preferably up to about 1.0 wt %, and more preferably about 0.2 wt % to about 0.6 wt %.

Silicon (Si) is sometimes added to the steel, preferably up to about 0.5 wt %, more preferably about 0.01 wt % to about 0.5 wt %, and even more preferably about 0.05 wt % to about 0.1 wt %.

Boron (B) is sometimes added to the steel, preferably up to about 0.0020 wt %, and more preferably about 0.0006 wt % to about 0.0010 wt %.

The steel preferably contains at least about 1 wt % nickel. Nickel content of the steel can be increased above about 3 wt % if desired to enhance performance after welding. Each 1 wt % addition of nickel is expected to lower the DBTT of the steel by about 10° C. (18° F.). Nickel content is preferably less than 9 wt %, more preferably less than about 6 wt %. Nickel content is preferably minimized in order to minimize cost of the steel. If nickel content is increased above about 3 wt %, manganese content can be decreased below about 0.5 wt % down to 0.0 wt %. Therefore, in a broad sense, up to about 2.5 wt % manganese is preferred.

Additionally, residuals are preferably substantially minimized in the steel. Phosphorous (P) content is preferably less than about 0.01 wt %. Sulfur (S) content is preferably less than about 0.004 wt %. Oxygen (O) content is preferably less than about 0.002 wt %.

In somewhat greater detail, a steel according to this first steel example is prepared by forming a slab of the desired composition as described herein; heating the slab to a temperature of from about 955° C. to about 1065° C. (1750° F.–1950° F.); hot rolling the slab to form steel plate in one or more passes providing about 30 percent to about 70 percent reduction in a first temperature range in which austenite recrystallizes, i.e., above about the $T_{nr}$ temperature, and further hot rolling the steel plate in one or more passes providing about 40 percent to about 80 percent reduction in a second temperature range below about the $T_{nr}$ temperature and above about the $Ar_3$ transformation temperature. The hot rolled steel plate is then quenched at a cooling rate of about 10° C. per second to about 40° C. per second (18° F./sec–72° F./sec) to a suitable QST (as defined in the Glossary) below about the $M_s$ transformation temperature plus 200° C. (360° F.), at which time the quenching is terminated. In one embodiment of this first steel example, the steel plate is then air cooled to ambient temperature. This processing is used to produce a microstructure preferably comprising predominantly fine-grained lath martensite, fine-grained lower bainite, or mixtures thereof, or, more preferably comprising substantially 100% fine-grained lath martensite.

The thus direct quenched martensite in steels according to this first steel example has high strength but its toughness can be improved by tempering at a suitable temperature from above about 400° C. (752° F.) up to about the $Ac_1$ transformation temperature. Tempering of steel within this temperature range also leads to reduction of the quenching stresses which in turn leads to enhanced toughness. While tempering can enhance the toughness of the steel, it normally leads to substantial loss of strength. In the present invention, the usual strength loss from tempering is offset by inducing precipitate dispersion hardening. Dispersion hardening from fine copper precipitates and mixed carbides and/or carbonitrides are utilized to optimize strength and toughness during the tempering of the martensitic structure. The unique chemistry of the steels of this first steel example allows for tempering within the broad range of about 400° C. to about 650° C. (750° F.–1200° F.) without any significant loss of the as-quenched strength. The steel plate is preferably tempered at a tempering temperature from above about 400° C. (752° F.) to below the $Ac_1$ transformation temperature for a period of time sufficient to cause precipitation of hardening particles (as defined herein). This processing facilitates transformation of the microstructure of the steel plate to predominantly tempered fine-grained lath martensite, tempered fine-grained lower bainite, or mixtures thereof. Again, the period of time sufficient to cause precipitation of hardening particles depends primarily on the thickness of the steel plate, the chemistry of the steel plate, and the tempering temperature, and can be determined by one skilled in the art.

Second Steel Example

As discussed above, a copending U.S. provisional patent application, having a priority date of Dec. 19, 1997, entitled "Ultra-High Strength Ausaged Steels With Excellent Cryogenic Temperature Toughness", and identified by the USPTO as application Ser. No. 60/068252, provides a description of other steels suitable for use in the present invention. A method is provided for preparing an ultra-high strength steel plate having a micro-laminate microstructure comprising about 2 vol % to about 10 vol % austenite film layers and about 90 vol % to about 98 vol % laths of predominantly fine-grained martensite and fine-grained lower bainite, said method comprising the steps of: (a) heating a steel slab to a reheating temperature sufficiently high to (i) substantially homogenize the steel slab, (ii) dissolve substantially all carbides and carbonitrides of niobium and vanadium in the steel slab, and (iii) establish fine initial austenite grains in the steel slab; (b) reducing the steel slab to form steel plate in one or more hot rolling passes in a first temperature range in which austenite recrystallizes; (c) further reducing the steel plate in one or more hot rolling passes in a second temperature range below about the $T_{nr}$ temperature and above about the $Ar_3$ transformation temperature; (d) quenching the steel plate at a cooling rate of about 10° C. per second to about 40° C. per second (18° F./sec–72° F./sec) to a Quench Stop Temperature (QST) below about the $M_s$ transformation temperature plus 100° C. (180° F.) and above about the $M_s$ transformation temperature; and (e) stopping said quenching. In one embodiment, the method of this second steel example further comprises the step of allowing the steel plate to air cool to ambient temperature from the QST. In another embodiment, the method of this second steel example further comprises the step of holding the steel plate substantially isothermally at the QST for up to about 5 minutes prior to allowing the steel plate to air cool to ambient temperature. In yet another embodiment, the method of this second steel example further comprises the step of slow-cooling the steel plate from the QST at a rate lower than about 1.0° C. per second (1.8° F./sec) for up to about 5 minutes prior to allowing the steel plate to air cool to ambient temperature. In yet another embodiment, the method of this invention further comprises the step of slow-cooling the steel plate from the QST at a rate lower than about 1.0° C. per second (1.8° F./sec) for up to about 5 minutes prior to allowing the steel plate to air cool to ambient temperature. This processing facilitates transformation of the microstructure of the steel plate to about 2 vol % to about 10 vol % of austenite film layers and about 90 vol % to about 98 vol % laths of predominantly fine-grained martensite and fine-grained lower bainite. (See Glossary for definitions of $T_{nr}$ temperature, and of $Ar_3$ and $M_s$ transformation temperatures.)

To ensure ambient and cryogenic temperature toughness, the laths in the micro-laminate microstructure preferably comprise predominantly lower bainite or martensite. It is preferable to substantially minimize the formation of embrittling constituents such as upper bainite, twinned martensite and MA. As used in this second steel example, and in the claims, "predominantly" means at least about 50 volume percent. The remainder of the microstructure can comprise additional fine-grained lower bainite, additional fine-grained lath martensite, or ferrite. More preferably, the microstructure comprises at least about 60 volume percent to about 80 volume percent lower bainite or lath martensite. Even more preferably, the microstructure comprises at least about 90 volume percent lower bainite or lath martensite.

A steel slab processed according to this second steel example is manufactured in a customary fashion and, in one embodiment, comprises iron and the following alloying elements, preferably in the weight ranges indicated in the following Table II:

TABLE II

| Alloying Element | Range (wt %) |
| --- | --- |
| carbon (C) | 0.04–0.12, more preferably 0.04–0.07 |
| manganese (Mn) | 0.5–2.5, more preferably 1.0–1.8 |
| nickel (Ni) | 1.0–3.0, more preferably 1.5–2.5 |
| copper (Cu) | 0.1–1.0, more preferably 0.2–0.5 |
| molybdenum (Mo) | 0.1–0.8, more preferably 0.2–0.4 |
| niobium (Nb) | 0.02–0.1, more preferably 0.02–0.05 |
| titanium (Ti) | 0.008–0.03, more preferably 0.01–0.02 |
| aluminum (Al) | 0.001–0.05, more preferably 0.005–0.03 |
| nitrogen (N) | 0.002–0.005, more preferably 0.002–0.003 |

Chromium (Cr) is sometimes added to the steel, preferably up to about 1.0 wt %, and more preferably about 0.2 wt % to about 0.6 wt %.

Silicon (Si) is sometimes added to the steel, preferably up to about 0.5 wt %, more preferably about 0.01 wt % to about 0.5 wt %, and even more preferably about 0.05 wt % to about 0.1 wt %.

Boron (B) is sometimes added to the steel, preferably up to about 0.0020 wt %, and more preferably about 0.0006 wt % to about 0.0010 wt %.

The steel preferably contains at least about 1 wt % nickel. Nickel content of the steel can be increased above about 3 wt % if desired to enhance performance after welding. Each 1 wt % addition of nickel is expected to lower the DBTT of the steel by about 10° C. (18° F.). Nickel content is preferably less than 9 wt %, more preferably less than about 6 wt %. Nickel content is preferably minimized in order to minimize cost of the steel. If nickel content is increased above about 3 wt %, manganese content can be decreased below about 0.5 wt % down to 0.0 wt %. Therefore, in a broad sense, up to about 2.5 wt % manganese is preferred.

Additionally, residuals are preferably substantially minimized in the steel. Phosphorous (P) content is preferably less than about 0.01 wt %. Sulfur (S) content is preferably less than about 0.004 wt %. Oxygen (O) content is preferably less than about 0.002 wt %.

In somewhat greater detail, a steel according to this second steel example is prepared by forming a slab of the desired composition as described herein; heating the slab to a temperature of from about 955° C. to about 1065° C. (1750° F.–1950° F.); hot rolling the slab to form steel plate in one or more passes providing about 30 percent to about 70 percent reduction in a first temperature range in which austenite recrystallizes, i.e., above about the $T_{nr}$ temperature, and further hot rolling the steel plate in one or more passes providing about 40 percent to about 80 percent reduction in a second temperature range below about the $T_{nr}$ temperature and above about the $Ar_3$ transformation temperature. The hot rolled steel plate is then quenched at a cooling rate of about 10° C. per second to about 40° C. per second (18° F./sec–72° F./sec) to a suitable QST below about the $M_s$ transformation temperature plus 100° C. (180° F.) and above about the $M_s$ transformation temperature, at which time the quenching is terminated. In one embodiment of this second steel example, after quenching is terminated the steel plate is allowed to air cool to ambient temperature from the QST. In another embodiment of this second steel example, after quenching is terminated the steel plate is held substantially isothermally at the QST for a period of time, preferably up to about 5 minutes, and then air cooled to ambient temperature. In yet another embodiment, the steel plate is slow-cooled at a rate slower than that of air cooling, i.e., at a rate lower than about 1° C. per second (1.8° F./sec), preferably for up to about 5 minutes. In yet another embodiment, the steel plate is slow-cooled from the QST at a rate slower than that of air cooling, i.e., at a rate lower than about 1° C. per second (1.8° F./sec), preferably for up to about 5 minutes. In at least one embodiment of this second steel example, the $M_s$ transformation temperature is about 350° C. (662° F.) and, therefore, the $M_s$ transformation temperature plus 100° C. (180° F.) is about 450° C. (842° F.).

The steel plate may be held substantially isothermally at the QST by any suitable means, as are known to those skilled in the art, such as by placing a thermal blanket over the steel plate. The steel plate may be slow-cooled after quenching is terminated by any suitable means, as are known to those skilled in the art, such as by placing an insulating blanket over the steel plate.

Third Steel Example

As discussed above, a copending U.S. provisional patent application, having a priority date of Dec. 19, 1997, entitled "Ultra-High Strength Dual Phase Steels With Excellent Cryogenic Temperature Toughness", and identified by the USPTO as application Ser. No. 60/068816, provides a description of other steels suitable for use in the present invention. A method is provided for preparing an ultra-high strength, dual phase steel plate having a microstructure comprising about 10 vol % to about 40 vol % of a first phase of substantially 100 vol % (i.e., substantially pure or "essentially") ferrite and about 60 vol % to about 90 vol % of a second phase of predominantly fine-grained lath martensite, fine-grained lower bainite, or mixtures thereof, wherein the method comprises the steps of (a) heating a steel slab to a reheating temperature sufficiently high to (i) substantially homogenize the steel slab, (ii) dissolve substantially all carbides and carbonitrides of niobium and vanadium in the steel slab, and (iii) establish fine initial austenite grains in the steel slab; (b) reducing the steel slab to form steel plate in one or more hot rolling passes in a first temperature range in which austenite recrystallizes; (c) further reducing the steel plate in one or more hot rolling passes in a second temperature range below about the $T_{nr}$ temperature and above about the $Ar_3$ transformation temperature; (d) further reducing said steel plate in one or more hot rolling passes in a third temperature range below about the $Ar_3$ transformation temperature and above about the $Ar_1$ transformation temperature (i.e., the intercritical temperature range); (e) quenching said steel plate at a cooling rate of about 10° C. per second to about 40° C. per second (18° F./sec–72° F./sec) to a Quench Stop Temperature (QST) preferably below about the $M_s$ transformation temperature plus 200° C. (360° F.); and (f) stopping said quenching. In another embodiment of this third steel example, the QST is preferably below about the $M_s$ transformation temperature plus 100° C. (180° F.), and is more preferably below about 350° C. (662° F.). In one embodiment of this third steel example, the steel plate is allowed to air cool to ambient temperature after step (f). This processing facilitates transformation of the microstructure of the steel plate to about 10 vol % to about 40 vol % of a first phase of ferrite and about 60 vol % to about 90 vol % of a second phase of predominantly fine-grained lath martensite, fine-grained lower bainite, or mixtures thereof. (See Glossary for definitions of $T_{nr}$ temperature, and of $Ar_3$ and $Ar_1$ transformation temperatures.)

To ensure ambient and cryogenic temperature toughness, the microstructure of the second phase in steels of this third steel example comprises predominantly fine-grained lower bainite, fine-grained lath martensite, or mixtures thereof. It is preferable to substantially minimize the formation of embrittling constituents such as upper bainite, twinned martensite and MA in the second phase. As used in this third steel example, and in the claims, "predominantly" means at least about 50 volume percent. The remainder of the second phase microstructure can comprise additional fine-grained lower bainite, additional fine-grained lath martensite, or ferrite. More preferably, the microstructure of the second phase comprises at least about 60 volume percent to about 80 volume percent fine-grained lower bainite, fine-grained lath martensite, or mixtures thereof Even more preferably, the microstructure of the second phase comprises at least about 90 volume percent fine-grained lower bainite, fine-grained lath martensite, or mixtures thereof.

A steel slab processed according to this third steel example is manufactured in a customary fashion and, in one embodiment, comprises iron and the following alloying elements, preferably in the weight ranges indicated in the following Table III:

TABLE III

| Alloying Element | Range (wt %) |
| --- | --- |
| carbon (C) | 0.04–0.12, more preferably 0.04–0.07 |
| manganese (Mn) | 0.5–2.5, more preferably 1.0–1.8 |
| nickel (Ni) | 1.0–3.0, more preferably 1.5–2.5 |
| niobium (Nb) | 0.02–0.1, more preferably 0.02–0.05 |
| titanium (Ti) | 0.008–0.03, more preferably 0.01–0.02 |
| aluminum (Al) | 0.001–0.05, more preferably 0.005–0.03 |
| nitrogen (N) | 0.002–0.005, more preferably 0.002–0.003 |

Chromium (Cr) is sometimes added to the steel, preferably up to about 1.0 wt %, and more preferably about 0.2 wt % to about 0.6 wt %.

Molybdenum (Mo) is sometimes added to the steel, preferably up to about 0.8 wt %, and more preferably about 0.1 wt % to about 0.3 wt %.

Silicon (Si) is sometimes added to the steel, preferably up to about 0.5 wt %, more preferably about 0.01 wt % to about 0.5 wt %, and even more preferably about 0.05 wt % to about 0.1 wt %.

Copper (Cu), preferably in the range of about 0.1 wt % to about 1.0 wt %, more preferably in the range of about 0.2 wt % to about 0.4 wt %, is sometimes added to the steel.

Boron (B) is sometimes added to the steel, preferably up to about 0.0020 wt %, and more preferably about 0.0006 wt % to about 0.0010 wt %.

The steel preferably contains at least about 1 wt % nickel. Nickel content of the steel can be increased above about 3 wt % if desired to enhance performance after welding. Each 1 wt % addition of nickel is expected to lower the DBTT of the steel by about 10° C. (18° F.). Nickel content is preferably less than 9 wt %, more preferably less than about 6 wt %. Nickel content is preferably minimized in order to minimize cost of the steel. If nickel content is increased above about 3 wt %, manganese content can be decreased below about 0.5 wt % down to 0.0 wt %. Therefore, in a broad sense, up to about 2.5 wt % manganese is preferred.

Additionally, residuals are preferably substantially minimized in the steel. Phosphorous (P) content is preferably less than about 0.01 wt %. Sulfur (S) content is preferably less than about 0.004 wt %. Oxygen (O) content is preferably less than about 0.002 wt %.

In somewhat greater detail, a steel according to this third steel example is prepared by forming a slab of the desired composition as described herein; heating the slab to a temperature of from about 955° C. to about 1065° C. (1750° F.–1950° F.); hot rolling the slab to form steel plate in one or more passes providing about 30 percent to about 70 percent reduction in a first temperature range in which austenite recrystallizes, i.e., above about the $T_{nr}$ temperature, further hot rolling the steel plate in one or more passes providing about 40 percent to about 80 percent reduction in a second temperature range below about the $T_{nr}$ temperature and above about the $Ar_3$ transformation temperature, and finish rolling the steel plate in one or more passes to provide about 15 percent to about 50 percent reduction in the intercritical temperature range below about the $Ar_3$ transformation temperature and above about the $Ar_1$ transformation temperature. The hot rolled steel plate is then quenched at a cooling rate of about 10° C. per second to about 40° C. per second (18° F./sec–72° F./sec) to a suitable Quench Stop Temperature (QST) preferably below about the $M_s$ transformation temperature plus 200° C. (360° F.), at which time the quenching is terminated. In another embodiment of this invention, the QST is preferably below about the $M_s$ transformation temperature plus 100° C. (180° F.), and is more preferably below about 350° C. (662° F.). In one embodiment of this third steel example, the steel plate is allowed to air cool to ambient temperature after quenching is terminated.

In the three example steels above, since Ni is an expensive alloying element, the Ni content of the steel is preferably less than about 3.0 wt %, more preferably less than about 2.5 wt %, more preferably less than about 2.0 wt %, and even more preferably less than about 1.8 wt %, to substantially minimize cost of the steel.

Other suitable steels for use in connection with the present invention are described in other publications that describe ultra-high strength, low alloy steels containing less than about 1 wt % nickel, having tensile strengths greater than 830 MPa (120 ksi), and having excellent low-temperature toughness. For example, such steels are described in a European Patent Application published Feb. 5, 1997, and having International application number: PCT/JP96/00157, and International publication number WO 96/23909 (08.08.1996 Gazette 1996/36) (such steels preferably having a copper content of 0.1 wt % to 1.2 wt %), and in a pending U.S. provisional patent application with a priority date of Jul. 28, 1997, entitled "Ultra-High Strength, Weldable Steels with Excellent Ultra-Low Temperature Toughness", and identified by the USPTO as application Ser. No. 60/053915.

For any of the above-referenced steels, as is understood by those skilled in the art, as used herein "percent reduction in thickness" refers to percent reduction in the thickness of the steel slab or plate prior to the reduction referenced. For purposes of explanation only, without thereby limiting this invention, a steel slab of about 25.4 cm (10 inches) thickness may be reduced about 50% (a 50 percent reduction), in a first temperature range, to a thickness of about 12.7 cm (5 inches) then reduced about 80% (an 80 percent reduction), in a second temperature range, to a thickness of about 2.5 cm (1 inch). Again, for purposes of explanation only, without thereby limiting this invention, a steel slab of about 25.4 cm (10 inches) may be reduced about 30% (a 30 percent reduction), in a first temperature range, to a thickness of about 17.8 cm (7 inches) then reduced about 80% (an 80 percent reduction), in a second temperature range, to a thickness of about 3.6 cm (1.4 inch), and then reduced about 30% (a 30 percent reduction), in a third temperature range, to a thickness of about 2.5 cm (1 inch). As used herein, "slab" means a piece of steel having any dimensions.

For any of the above-referenced steels, as is understood by those skilled in the art, the steel slab is preferably reheated by a suitable means for raising the temperature of substantially the entire slab, preferably the entire slab, to the desired reheating temperature, e.g., by placing the slab in a furnace for a period of time. The specific reheating temperature that should be used for any of the above-referenced steel compositions may be readily determined by a person skilled in the art, either by experiment or by calculation using suitable models. Additionally, the furnace temperature and reheating time necessary to raise the temperature of substantially the entire slab, preferably the entire slab, to the desired reheating temperature may be readily determined by a person skilled in the art by reference to standard industry publications.

For any of the above-referenced steels, as is understood by those skilled in the art, the temperature that defines the boundary between the recrystallization range and non-recrystallization range, the $T_{nr}$ temperature, depends on the chemistry of the steel, and more particularly, on the reheating temperature before rolling, the carbon concentration, the niobium concentration and the amount of reduction given in the rolling passes. Persons skilled in the art may determine this temperature for each steel composition either by experiment or by model calculation. Likewise, the $Ac_1$, $Ar_1$, $Ar_3$, and $M_s$ transformation temperatures referenced herein may be determined by persons skilled in the art for each steel composition either by experiment or by model calculation.

For any of the above-referenced steels, as is understood by those skilled in the art, except for the reheating temperature, which applies to substantially the entire slab, subsequent temperatures referenced in describing the processing methods of this invention are temperatures measured at the surface of the steel. The surface temperature of steel can be measured by use of an optical pyrometer, for example, or by any other device suitable for measuring the surface temperature of steel. The cooling rates referred to herein are those at the center, or substantially at the center, of the plate thickness; and the Quench Stop Temperature (QST) is the highest, or substantially the highest, temperature reached at the surface of the plate, after quenching is stopped, because of heat transmitted from the mid-thickness of the plate. For example, during processing of experimental heats of a steel composition according to the examples provided herein, a thermocouple is placed at the center, or substantially at the center, of the steel plate thickness for center temperature measurement, while the surface temperature is measured by use of an optical pyrometer. A correlation between center temperature and surface temperature is developed for use during subsequent processing of the same, or substantially the same, steel composition, such that center temperature may be determined via direct measurement of surface temperature. Also, the required temperature and flow rate of the quenching fluid to accomplish the desired accelerated cooling rate may be determined by one skilled in the art by reference to standard industry publications.

A person of skill in the art has the requisite knowledge and skill to use the information provided herein to produce ultra-high strength, low alloy steel plates having suitable high strength and toughness for use in constructing the containers and other components of the present invention. Other suitable steels may exist or be developed hereafter. All such steels are within the scope of the present invention.

A person of skill in the art has the requisite knowledge and skill to use the information provided herein to produce ultra-high strength, low alloy steel plates having modified thicknesses, compared to the thicknesses of the steel plates produced according to the examples provided herein, while still producing steel plates having suitable high strength and suitable cryogenic temperature toughness for use in the system of the present invention. For example, one skilled in the art may use the information provided herein to produce a steel plate with a thickness of about 2.54 cm (1 inch) and suitable high strength and suitable cryogenic temperature toughness for use in constructing the containers and other components of the present invention. Other suitable steels may exist or be developed hereafter. All such steels are within the scope of the present invention.

When a dual phase steel is used in the construction of containers according to this invention, the dual phase steel is preferably processed in such a manner that the time period during which the steel is maintained in the intercritical temperature range for the purpose of creating the dual phase structure occurs before the accelerated cooling or quenching step. Preferably the processing is such that the dual phase structure is formed during cooling of the steel between the $Ar_3$ transformation temperature to about the $Ar_1$ transformation temperature. An additional preference for steels used in the construction of containers according to this invention is that the steel has a tensile strength greater than 830 MPa (120 ksi) and a DBTT lower than about −73° C. (−100° F.) upon completion of the accelerated cooling or quenching step, i.e., without any additional processing that requires reheating of the steel such as tempering. More preferably the tensile strength of the steel upon completion of the quenching or cooling step is greater than about 860 MPa (125 ksi), and more preferably greater than about 900 MPa (130 ksi). In some applications, a steel having a tensile strength of greater than about 930 MPa (135 ksi), or greater than about 965 MPa (140 ksi), or greater than about 1000 MPa (145 ksi), upon completion of the quenching or cooling step is preferable.

Joining Methods for Construction of Containers and Other Components

In order to construct the containers and other components of the present invention, a suitable method of joining the steel plates is required. Any joining method that will provide joints with adequate strength and toughness for the present invention, as discussed above, is considered to be suitable. Preferably, a welding method suitable for providing adequate strength and fracture toughness to contain the fluid being contained or transported is used to construct the containers and other components of the present invention. Such a welding method preferably includes a suitable consumable wire, a suitable consumable gas, a suitable welding process, and a suitable welding procedure. For example, both gas metal arc welding (GMAW) and tungsten inert gas (TIG) welding, which are both well known in the steel fabrication industry, can be used to join the steel plates, provided that a suitable consumable wire-gas combination is used.

In a first example welding method, the gas metal arc welding (GMAW) process is used to produce a weld metal chemistry comprising iron and about 0.07 wt % carbon, about 2.05 wt % manganese, about 0.32 wt % silicon, about 2.20 wt % nickel, about 0.45 wt % chromium, about 0.56 wt % molybdenum, less than about 110 ppm phosphorous, and less than about 50 ppm sulfur. The weld is made on a steel, such as any of the above-described steels, using an argon-based shielding gas with less than about 1 wt % oxygen. The welding heat input is in the range of about 0.3 kJ/mm to about 1.5 kJ/mm (7.6 kJ/inch to 38 kJ/inch). Welding by this method provides a weldment (see Glossary) having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

In another example welding method, the GMAW process is used to produce a weld metal chemistry comprising iron and about 0.10 wt % carbon (preferably less than about 0.10 wt % carbon, more preferably from about 0.07 to about 0.08 wt % carbon), about 1.60 wt % manganese, about 0.25 wt % silicon, about 1.87 wt % nickel, about 0.87 wt % chromium, about 0.51 wt % molybdenum, less than about 75 ppm phosphorous, and less than about 100 ppm sulfur. The welding heat input is in the range of about 0.3 kJ/mm to about 1.5 kJ/mm (7.6 kJ/inch to 38 kJ/inch) and a preheat of about 100° C. (212° F.) is used. The weld is made on a steel, such as any of the above-described steels, using an argon-based shielding gas with less than about 1 wt % oxygen. Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

In another example welding method, the tungsten inert gas welding (TIG) process is used to produce a weld metal chemistry containing iron and about 0.07 wt % carbon (preferably less than about 0.07 wt % carbon), about 1.80 wt % manganese, about 0.20 wt % silicon, about 4.00 wt % nickel, about 0.5 wt % chromium, about 0.40 wt % molybdenum, about 0.02 wt % copper, about 0.02 wt % aluminum, about 0.010 wt % titanium, about 0.015 wt % zirconium (Zr), less than about 50 ppm phosphorous, and less than about 30 ppm sulfur. The welding heat input is in the range of about 0.3 kJ/mm to about 1.5 kJ/mm (7.6 kJ/inch to 38 kJ/inch) and a preheat of about 100° C. (212° F.) is used. The weld is made on a steel, such as any of the above-described steels, using an argon-based shielding gas with less than about 1 wt % oxygen. Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

Similar weld metal chemistries to those mentioned in the examples can be made using either the GMAW or the TIG welding processes. However, the TIG welds are anticipated to have lower impurity content and a more highly refined microstructure than the GMAW welds, and thus improved low temperature toughness.

A person of skill in the art has the requisite knowledge and skill to use the information provided herein to weld ultra-high strength, low alloy steel plates to produce joints having suitable high strength and fracture toughness for use in constructing the containers and other components of the present invention. Other suitable joining or welding methods may exist or be developed hereafter. All such joining or welding methods are within the scope of the present invention.

Construction of Containers and Other Components

Without hereby limiting this invention: containers and other components (i) constructed from materials comprising ultra-high strength, low alloy steels containing less than 9 wt % nickel and (ii) having adequate strength and cryogenic temperature fracture toughness to contain cryogenic temperature fluids, particularly PLNG, are provided; further, containers and other components constructed from materials comprising ultra-high strength, low alloy steels containing less than 9 wt % nickel and having a tensile strength greater than 830 MPa (120 ksi) and a DBTT lower than about −73° C. (−100° F.), are provided; further, containers and other components (i) constructed from materials comprising ultra-high strength, low alloy steels containing less than about 3 wt % nickel and (ii) having adequate strength and cryogenic temperature fracture toughness to contain cryogenic temperature fluids, particularly PLNG, are provided; and further, containers and other components, (i) constructed from materials comprising ultra-high strength, low alloy steels containing less than about 3 wt % nickel and (ii) having tensile strengths exceeding about 1000 MPa (145 ksi) and DBTTs lower than about −73° C. (−100° F.), are provided. Such containers and other components are preferably constructed from the ultra-high strength, low alloy steels with excellent cryogenic temperature toughness described herein.

The containers and other components of this invention are preferably constructed from discrete plates of ultra-high strength, low alloy steel with excellent cryogenic temperature toughness. Where applicable, the joints of the containers and other components preferably have about the same strength and toughness as the ultra-high strength, low alloy steel plates. In some cases, an undermatching of the strength on the order of about 5% to about 10% may be justified for locations of lower stress. Joints with the preferred properties can be made by any suitable joining technique. Exemplary joining techniques described herein, under the subheading "Joining Methods for Construction of Containers and Other Components ".

As will be familiar to those skilled in the art, the Charpy V-notch (CVN) test can be used for the purpose of fracture toughness assessment and fracture control in the design of containers for transporting pressurized, cryogenic temperature fluids, such as PLNG, particularly through use of the ductile-to-brittle transition temperature (DBTT). The DBTT delineates two fracture regimes in structural steels. At temperatures below the DBTT, failure in the Charpy V-notch test tends to occur by low energy cleavage (brittle) fracture, while at temperatures above the DBTT, failure tends to occur by high energy ductile fracture. Containers that are constructed from welded steels for the transportation of PLNG and for other load-bearing, cryogenic temperature service must have DBTTs, as determined by the Charpy V-notch test, well below the service temperature of the structure in order to avoid brittle failure. Depending on the design, the service conditions, and/or the requirements of the applicable classification society, the required DBTT temperature shift may be from 5° C. to 30° C. (9° F. to 54° F.) below the service temperature.

As will be familiar to those skilled in the art, the operating conditions taken into consideration in the design of containers constructed from a welded steel for storing and transporting pressurized, cryogenic fluids, such as PLNG, include among other things, the operating pressure and temperature, as well as additional stresses that are likely to be imposed on the steel and the weldments (see Glossary). Standard fracture mechanics measurements, such as (i) critical stress intensity factor ($K_{IC}$), which is a measurement of plane-strain fracture toughness, and (ii) crack tip opening displacement (CTOD), which can be used to measure elastic-plastic fracture toughness, both of which are familiar to those skilled in the art, may be used to determine the fracture toughness of the steel and the weldments. Industry codes generally acceptable for steel structure design, for example, as presented in the BSI publication "Guidance on methods for assessing the acceptability of flaws in fusion welded structures", often referred to as "PD 6493: 1991", may be used to determine the maximum allowable flaw sizes for the container based on the fracture toughness of the steel and weldment (including HAZ) and the imposed stresses on the container. A person skilled in the art can develop a fracture control program to mitigate fracture initiation through (i) appropriate container design to minimize imposed stresses, (ii) appropriate manufacturing quality control to minimize defects, (iii) appropriate control of life cycle loads and pressures applied to the container, and (iv) an appropriate inspection program to reliably detect flaws and defects in the container. A preferred design philosophy for the system of the present invention is "leak before failure", as is familiar to those skilled in the art. These considerations are generally referred to herein as "known principles of fracture mechanics."

The following is a non-limiting example of application of these known principles of fracture mechanics in a procedure for calculating critical flaw depth for a given flaw length for use in a fracture control plan to prevent fracture initiation in a container according to this invention.

Figure 4A:
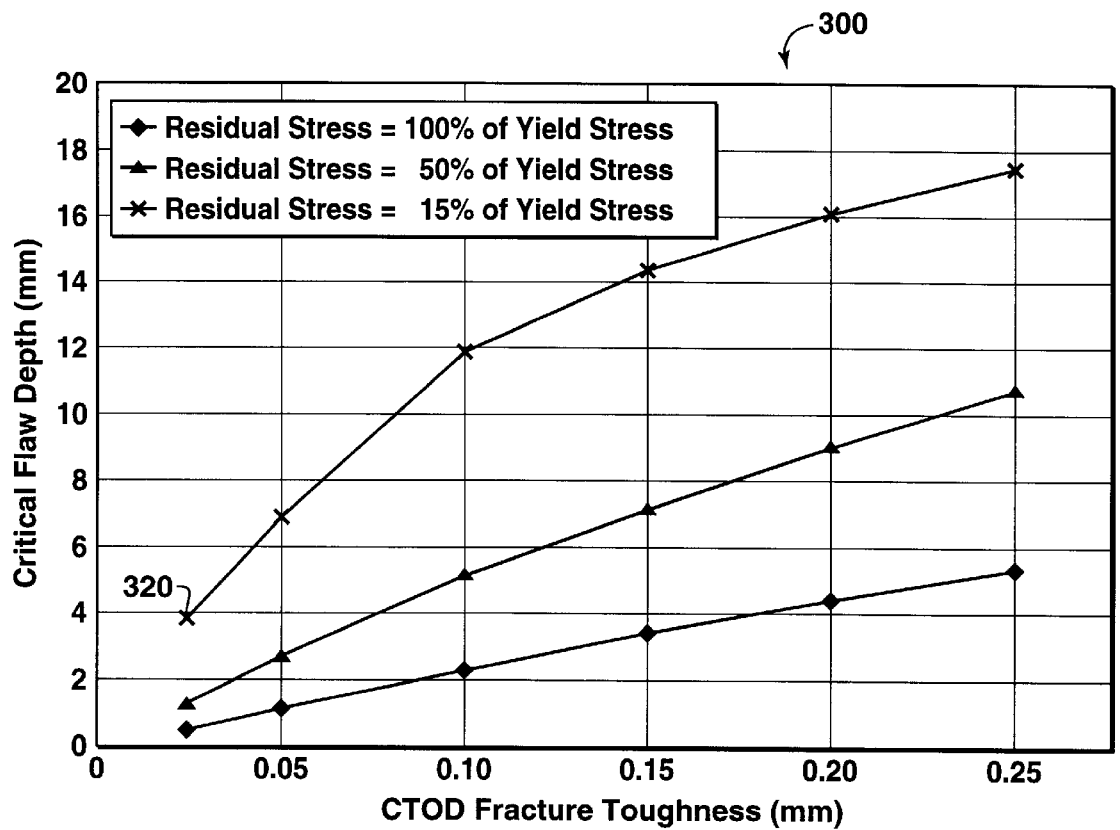
FIG. 4A illustrates a plot of critical flaw depth, for a given flaw length, as a function of CTOD fracture toughness and of residual stress.
Figure 4B:
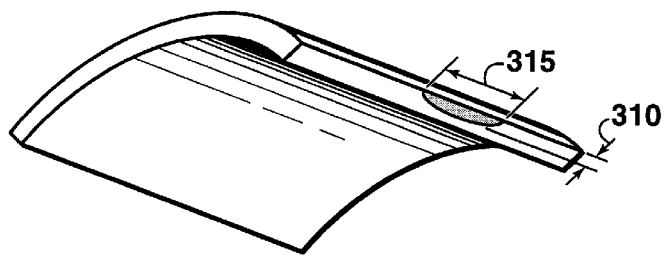
FIG. 4B illustrates the geometry (length and depth) of a flaw.

FIG. 4B illustrates a flaw of flaw length 315 and flaw depth 310. PD6493 is used to calculate values for the critical flaw size plot 300 shown in FIG. 4A based on the following design conditions for a pressure vessel or container:

| | |
|---|---|
| Vessel Diameter: | 4.57 m (15 ft) |
| Vessel Wall Thickness: | 25.4 mm (1.00 in.) |
| Design Pressure: | 3445 kPa (500 psi) |
| Allowable Hoop Stress: | 333 MPa (48.3 ksi). |

For the purpose of this example, a surface flaw length of 100 mm (4 inches), e.g., an axial flaw located in a seam weld, is assumed. Referring now to FIG. 4A, plot 300 shows the value for critical flaw depth as a function of CTOD fracture toughness and of residual stress, for residual stress levels of 15, 50 and 100 percent of yield stress. Residual stresses can be generated due to fabrication and welding; and PD6493 recommends the use of a residual stress value of 100 percent of yield stress in welds (including the weld HAZ) unless the welds are stress relieved using techniques such as post weld heat treatment (PWHT) or mechanical stress relief.

Based on the CTOD fracture toughness of the steel at the minimum service temperature, the container fabrication can be adjusted to reduce the residual stresses and an inspection program can be implemented (for both initial inspection and in-service inspection) to detect and measure flaws for comparison against critical flaw size. In this example, if the steel has a CTOD toughness of 0.025 mm at the minimum service temperature (as measured using laboratory specimens) and the residual stresses are reduced to 15 percent of the steel yield strength, then the value for critical flaw depth is approximately 4 mm (see point 320 on FIG. 4A). Following similar calculation procedures, as are well known to those skilled in the art, critical flaw depths can be determined for various flaw lengths as well as various flaw geometries. Using this information, a quality control program and inspection program (techniques, detectable flaw dimensions, frequency) can be developed to ensure that flaws are detected and remedied prior to reaching the critical flaw depth or prior to the application of the design loads. Based on published empirical correlations between CVN, $K_{IC}$ and CTOD fracture toughness, the 0.025 mm CTOD toughness generally correlates to a CVN value of about 37 J. This example is not intended to limit this invention in any way.

For containers and other components that require bending of the steel, e.g., into a cylindrical shape for a container or into a tubular shape for a pipe, the steel is preferably bent into the desired shape at ambient temperature in order to avoid detrimentally affecting the excellent cryogenic temperature toughness of the steel. If the steel must be heated to achieve the desired shape after bending, the steel is preferably heated to a temperature no higher than about 600° C. (1112° F.) in order to preserve the beneficial effects of the steel microstructure as described above.

The unique advantages associated with such containers and other components are described in detail below.

Systems for Vehicular, Land-Based Distribution of PLNG

Figure 3A:
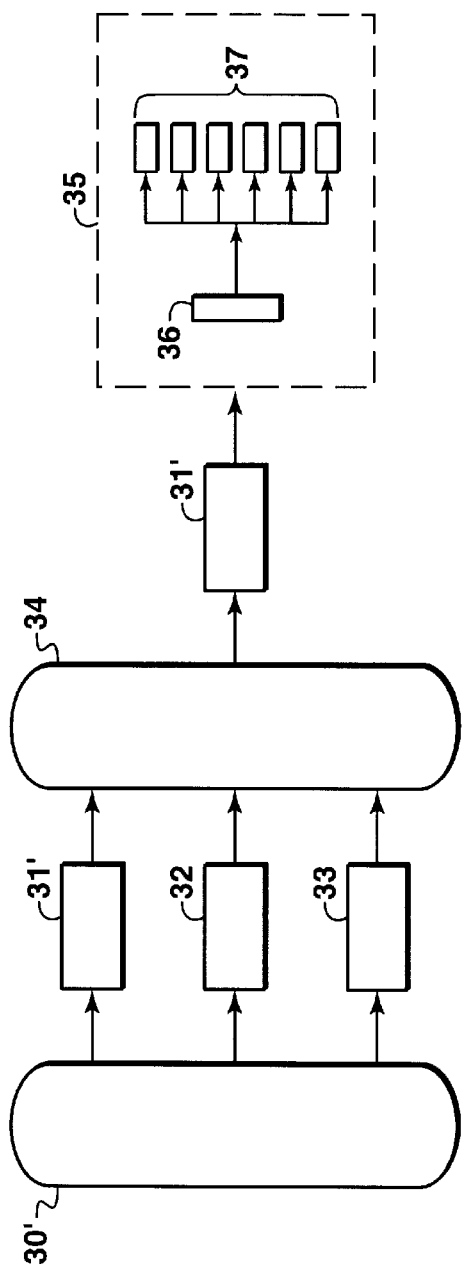
FIG. 3A illustrates an infrastructure for vehicular, land-based distribution of PLNG according to the present invention.
Figure 3B:
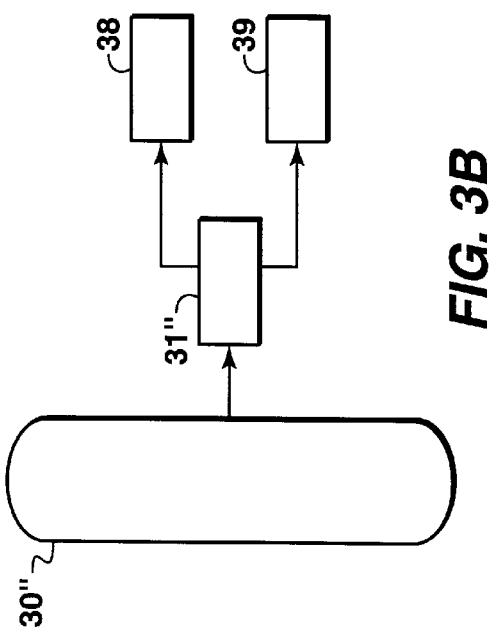
FIG. 3B illustrates an infrastructure for vehicular, land-based distribution of PLNG according to the present invention.

Referring to FIG. 3A, one embodiment of an infrastructure for vehicular, land-based distribution of PLNG according to the present invention is illustrated. PLNG is stored in at least one primary storage container 30' and, at times, distributed by tanker truck 31', railcar 32, or barge 33 to at least one secondary storage container 34. Thereafter, PLNG is distributed by tanker truck 31' from secondary storage container 34 to a distribution site 35, such as a filling station. Alternatively, PLNG is distributed directly from at least one primary storage container 30' to a distribution site 35. In one embodiment, PLNG is then pumped, via cryogenic pump 36, from distribution site 35 to various vehicles 37 for consumption. In another embodiment, no pump is required due to the high pressure of PLNG in distribution site 35. Vehicles 37 include, for example, without thereby limiting this invention, planes, buses, automobiles, and trains. In another example, referring now to FIG. 3B, PLNG is distributed from at least one primary storage container 30" by tanker truck 31", with an on-board vaporizer (not shown in FIG. 3B), directly into a pipeline 38 or power station 39. In other examples, PLNG may be distributed via any of the systems described below.

(1) Systems for distributing PLNG to meet fuel needs at remote sites

Systems are provided for distributing PLNG to meet fuel needs at remote sites. In one embodiment, without thereby limiting this invention, a system for distributing PLNG to meet fuel needs at remote sites includes at least one tanker truck having at least one container with a fill and drain line and a vent line according to the present invention, at least one container with a fill and drain line and a vent line according to the present invention at a remote site, and at least one cryogenic pump.

In the simplest of such a system, the desired volume of liquid PLNG fuel is pumped by a cryogenic pump into a container on a tanker truck from a PLNG fuel storage site via interconnected fill and drain lines, one from the container and one from the PLNG fuel storage site, while vapor PLNG fuel flows from the container to the PLNG fuel storage site, via interconnected vapor lines, to equilibrate the pressure between the container and the PLNG fuel storage site. When PLNG fuel transfer is completed, the tanker truck transports the PLNG fuel to the remote site. At the remote site, liquid PLNG fuel is transferred from the container on the tanker truck to a storage container at the remote site or, alternatively, liquid PLNG fuel is transferred from the container on the tanker truck through a vaporizer and transformed to vapor PLNG fuel, which in turn is transferred directly to an end use site.

(2) Systems for distributing PLNG to meet fuel needs of manufacturing plants

Systems are provided for distributing PLNG to meet fuel needs of manufacturing plants. Such systems are similar to systems for distributing PLNG to meet fuel needs at remote sites, wherein the remote site is a manufacturing plant.

(3) Systems for 'portable pipeline' distribution of PLNG

Systems are provided for 'portable pipeline' distribution of PLNG. Such systems are similar to systems for distributing PLNG to meet fuel needs at remote sites, wherein the remote site is a gas entry connection to a gas pipeline and the liquid PLNG fuel from the container is vaporized in a vaporizer so that vaporized PLNG fuel is flowed directly into the gas pipeline.

(4) Systems for distributing PLNG for vehicle refueling stations

Systems are provided for distributing PLNG for vehicle refueling stations. Such systems are similar to systems for distributing PLNG to meet fuel needs at remote sites, wherein the remote site is a vehicle refueling station.

Containers and other components of the above-described systems for vehicular, land-based distribution of PLNG are constructed from any suitable ultra-high strength, low alloy steel as described herein, such as any of the steels described above under the sub-heading "Steel for Construction of Components and Containers". The containers and other components are sized according to the needs of the PLNG project in which the system will be utilized. A person skilled in the art may use standard engineering practices and references available in the industry to determine the necessary dimensions, wall thickness, etc. for the containers and other components.

The systems of this invention are advantageously used for containing and distributing/transporting PLNG. Additionally, the systems of this invention are advantageously used (i) for containing and transporting other pressurized, cryogenic fluids, (ii) for containing and transporting pressurized, non-cryogenic fluids, or (iii) for containing and transporting cryogenic fluids at atmospheric pressure.

A primary advantage of PLNG distribution for consumption, which is made possible by the systems of this invention, compared with LNG distribution, is the much higher temperature of PLNG. For example, for identical mechanical system design for PLNG vs. LNG, the radiation heat leak is reduced by over 10%, the convection heat leak is reduced by over 30%, and the dominant conduction heat leak is reduced by over 30%. This results in an overall improvement in the economics of product delivery either through reduced product loss due to low boil-off rate or through reduced cost of insulation for fixed boil-off rate. In particular, at the higher storage temperature of PLNG, cheaper alternative insulation such as expanded foams, gas-filled powders, and fibrous materials may be used in place of vacuum or multi-layer insulation.

While the foregoing invention has been described in terms of one or more preferred embodiments, it should be understood that other modifications may be made without departing from the scope of the invention, which is set forth in the claims below.

Glossary of terms:

| | |
|---|---|
| $Ac_1$ transformation temperature: | the temperature at which austenite begins to form during heating; |
| $Ac_3$ transformation temperature: | the temperature at which transformation of ferrite to austenite is completed during heating; |
| $Ar_1$ transformation temperature: | the temperature at which transformation of austenite to ferrite or to ferrite plus cementite is completed during cooling; |
| $Ar_3$ transformation temperature: | the temperature at which austenite begins to transform to ferrite during cooling; |
| cryogenic temperatures: | temperatures lower than about −40° C. (−40° F.); |
| CTOD: | crack tip opening displacement; |
| CVN: | Charpy-V-notch; |
| DBTT (Ductile to Brittle Transition Temperature: | delineates the two fracture regimes in structural steels; at temperatures below the DBTT, failure tends to occur by low energy cleavage (brittle) fracture, while at temperatures above the DBTT, failure tends to occur by high energy ductile fracture; |
| essentially: | substantially 100 vol %; |
| g: | local acceleration due to gravity; |
| $Gm^3$: | billion cubic meters; |
| GMAW: | gas metal arc welding; |
| hardening particles | one or more of ε-copper, $Mo_2C$, or the carbides and carbonitrides of niobium and vanadium; |
| HAZ: | heat affected zone; |
| intercritical temperature range: | from about the $Ac_1$ transformation temperature to about the $Ac_3$ transformation temperature on heating, and from about the $Ar_3$ transformation temperature to about the $Ar_1$ transformation temperature on cooling; |
| $K_{IC}$: | critical stress intensity factor; |
| kJ: | kilojoule; |
| kPa: | thousands of Pascals; |
| ksi: | thousands of pounds per square inch; |
| low alloy steel: | a steel containing iron and less than about 10 wt % total alloy additives; |
| MA: | martensite-austenite; |
| maximum allowable flaw size: | critical flaw length and depth; |
| $Mo_2C$: | a form of molybdenum carbide; |
| MPa: | millions of Pascals; |
| $M_S$ transformation temperature: | the temperature at which transformation of austenite to martensite starts during cooling; |
| PLNG: | pressurized liquefied natural gas; |
| predominantly: | at least about 50 volume percent; |
| ppm: | parts-per-million; |
| psia: | pounds per square inch absolute; |
| quenching: | accelerated cooling by any means whereby a fluid selected for its tendency to increase the cooling rate of the steel is utilized, as opposed to air cooling; |
| quenching (cooling) rate: | cooling rate at the center, or substantially at the center, of the plate thickness; |
| Quench Stop Temperature: | the highest, or substantially the highest, temperature reached at the surface of the plate, after quenching is stopped, because of heat transmitted from the mid-thickness of the plate; |
| QST: | Quench Stop Temperature; |
| slab: | a piece of steel having any dimensions; |
| tanker truck: | any means for vehicular, land-based distribution of PLNG, LNG, or other cryogenic fluids, including without limitation, tanker trucks, railcars, and barges; |
| TCF: | trillion cubic feet; |
| tensile strength: | in tensile testing, the ratio of maximum load to original cross-sectional area; |
| TIG welding: | tungsten inert gas welding; |
| $T_{nr}$ temperature: | the temperature below which austenite does not recrystallize; |
| USPTO: | United States Patent and Trademark Office; and |
| weldment: | a welded joint, including: (i) the weld metal, (ii) the heat-affected zone (HAZ), and (iii) the base metal in the "near vicinity" of the HAZ. The portion of the base metal that is considered within the "near vicinity" of the HAZ, and therefore, a part of the weldment, varies depending on factors known to those skilled in the art, for example, without limitation, the width of the weldment, the size of the item that was welded, the number of weldments required to fabricate the item, and the distance between weldments. |

What we claim is:

1. A container suitable for use in a tanker truck for transporting a pressurized liquefied natural gas at a pressure of about 1035 kPa (150 psia) to about 7590 kPa (1100 psia) and at a temperature of about −123° C. (−190° F.) to about −62° C. (−80° F.), wherein said container is constructed by joining together a plurality of discrete plates of materials comprising an ultra-high strength, low alloy steel containing less than 9 wt % nickel and having a tensile strength greater than 830 MPa (120 ksi) and a DBTT lower than about −73° C. (−100° F.), wherein joints between said discrete plates have adequate strength and toughness at said pressure and temperature conditions to contain said pressurized liquefied natural gas.

2. The container of claim 1, wherein said joints have a strength of at least 90% of the tensile strength of said ultra-high strength, low alloy steel.

3. The container of claim 1, wherein said joints have a DBTT lower than about −73° C. (−100° F.).

4. The container of claim 1, wherein said joints are formed by gas metal arc welding.

5. The container of claim 1, wherein said joints are formed by tungsten inert gas welding.

6. A tanker truck for transporting a pressurized liquefied natural gas at a pressure of about 1035 kPa (150 psia) to about 7590 kPa (1100 psia) and at a temperature of about −123° C. (−190° F.) to about −62° C. (−80° F.), wherein said tanker truck has at least one storage container that is constructed by joining together a plurality of discrete plates of materials comprising an ultra-high strength, low alloy steel containing less than 9 wt % nickel and having a tensile strength greater than 830 MPa (120 ksi) and a DBTT lower than about −73° C. (−100° F.), wherein joints between said discrete plates have adequate strength and toughness at said pressure and temperature conditions to contain said pressurized liquefied natural gas.

7. The tanker truck of claim 6 having on-board vaporizing equipment for converting said pressurized liquefied natural gas to a gas and delivering said gas to pipelines or users' facilities.

8. A system for transporting a pressurized liquefied natural gas to a destination site, wherein said pressurized liquefied natural gas has a pressure of about 1035 kPa (150 psia) to about 7590 kPa (1100 psia) and a temperature of about −123° C. (−190° F.) to about −62° C. (−80° F.), said system comprising at least one tanker truck, wherein said at least one tanker truck has at least one storage container that is constructed by joining together a plurality of discrete plates of materials comprising an ultra-high strength, low alloy steel containing less than 9 wt % nickel and having a tensile strength greater than 830 MPa (120 ksi) and a DBTT lower than about −73° C. (−100° F.), and wherein joints between said discrete plates have adequate strength and toughness at said pressure and temperature conditions to contain said pressurized liquefied natural gas.

9. The system of claim 8, wherein said at least one tanker truck has on-board vaporizing equipment for converting said pressurized liquefied natural gas to a gas and delivering said gas to pipelines or users' facilities.

10. A container suitable for use in a tanker truck for transporting pressurized liquefied natural gas at a pressure of about 1725 kPa (250 psia) to about 7590 kPa (1100 psia) and at a temperature of about −112° C. (−170° F.) to about −62° C. (−80° F.), said container being constructed by joining together a plurality of discrete plates of a low-alloy, high-strength steel containing less than about 2 wt % nickel and having adequate strength and fracture toughness to contain said pressurized liquefied natural gas, wherein joints between said discrete plates have adequate strength and toughness at said pressure and temperature conditions to contain said pressurized liquefied natural gas.

11. A method of transporting a pressurized liquefied natural gas from a storage site to a destination site, wherein said pressurized liquefied natural gas has a pressure of about 1035 kPa (150 psia) to about 7590 kPa (1100 psia) and a temperature of about −123° C. (−190° F.) to about −62° C. (−80° F.), said method comprising the step of (a) transporting said pressurized liquefied natural gas in a tanker truck, wherein said tanker truck has at least one storage container that is constructed by joining together a plurality of discrete plates of materials comprising an ultra-high strength, low alloy steel containing less than 9 wt % nickel and having a tensile strength greater than 830 MPa (120 ksi) and a DBTT lower than about −73° C. (−100° F.), and wherein joints between said discrete plates have adequate strength and toughness at said pressure and temperature conditions to contain said pressurized liquefied natural gas.

12. The method of claim 11 further comprising the step of:

(b) delivering said pressurized liquefied natural gas to at least one end-use storage container at said destination site, wherein said end-use storage container is constructed by joining together a plurality of discrete plates of materials comprising an ultra-high strength, low alloy steel containing less than 9 wt % nickel and having a tensile strength greater than 830 MPa (120 ksi) and a DBTT lower than about −73° C. (−100° F.), and wherein joints between said discrete plates have adequate strength and toughness at said pressure and temperature conditions to contain said pressurized liquefied natural gas.

13. The method of claim 11, wherein said tanker truck has on-board vaporizing equipment for converting said pressurized liquefied natural gas to a gas and delivering said gas to pipelines or users' facilities.

14. The method of claim 13 further comprising the step of:

(c) delivering said gas to a pipeline.

* * * * *